US012411451B2

(12) United States Patent
Urabe

(10) Patent No.: US 12,411,451 B2
(45) Date of Patent: Sep. 9, 2025

(54) IMAGE FORMING APPARATUS

(71) Applicant: Oki Electric Industry Co., Ltd., Tokyo (JP)

(72) Inventor: Tomoya Urabe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 18/504,584

(22) Filed: Nov. 8, 2023

(65) Prior Publication Data

US 2024/0176279 A1 May 30, 2024

(30) Foreign Application Priority Data

Nov. 25, 2022 (JP) ................................ 2022-188276

(51) Int. Cl.
*G03G 21/16* (2006.01)

(52) U.S. Cl.
CPC ..... *G03G 21/1633* (2013.01); *G03G 21/1647* (2013.01); *G03G 21/1685* (2013.01)

(58) Field of Classification Search
CPC ........... G03G 21/1633; G03G 15/2053; G03G 21/168; G03G 15/1605; G03G 15/161
See application file for complete search history.

(56) References Cited

U.S. PATENT DOCUMENTS

| | | | | |
|---|---|---|---|---|
| 6,571,073 B1 * | 5/2003 | Suzuki | G03G 21/1619 399/116 |
| 2008/0219700 A1 * | 9/2008 | Saiki | G03G 21/1842 399/122 |
| 2014/0174888 A1 * | 6/2014 | Koshida | G03G 15/00 198/497 |
| 2018/0136603 A1 * | 5/2018 | Watanabe | G03G 21/168 |
| 2021/0356888 A1 * | 11/2021 | Chikugo | G03G 15/2053 |

FOREIGN PATENT DOCUMENTS

JP 2000-098676 A 4/2000

* cited by examiner

*Primary Examiner* — Jessica L Eley
(74) *Attorney, Agent, or Firm* — Rabin & Berdo, P.C.

(57) ABSTRACT

An image forming apparatus includes an apparatus body, a fixing unit attachable to the apparatus body in a first direction, and a transfer unit serving as a belt unit attachable in an attachment position within the apparatus body in a second direction intersecting the first direction. The transfer unit has a protrusion serving as a restricting portion that restricts the attachment of the fixing unit when the transfer unit is positioned in a first irregular position different from the attachment position.

12 Claims, 23 Drawing Sheets

31R

31R

IMAGE FORMING APPARATUS

BACKGROUND OF THE INVENTION

1. Field of the Invention

The present disclosure relates to an image forming apparatus including a belt unit.

2. Description of the Related Art

There is a known image forming apparatus that includes an apparatus body and a belt unit attachable to and detachable from the apparatus body (see, for example, Japanese Patent Application Publication No. 2000-98676 (see FIG. 9)).

However, in such conventional image forming apparatuses, if a belt unit is incorrectly attached to an irregular position different from a regular attachment position, there is a possibility that a user may not notice the incorrect attachment.

SUMMARY OF THE INVENTION

The present disclosure has been made to solve the above problems, and an object of the present disclosure is to provide an image forming apparatus with a simple configuration that enables a user to easily recognize the incorrect attachment of a belt unit.

An image forming apparatus of the present disclosure includes: an apparatus body, a fixing unit attachable to the apparatus body in a first direction, and a belt unit attachable in an attachment position within the apparatus body in a second direction intersecting the first direction. The belt unit has a restricting portion that restricts the attachment of the fixing unit when the belt unit is positioned in a first irregular position different from the attachment position.

According to the present disclosure, the attachment of the fixing unit is restricted by the restricting portion when the belt unit is positioned in the first irregular position different from the attachment position. Therefore, with a simple configuration, it becomes possible to enable the user to easily recognize incorrect attachment of the belt unit.

DETAILED DESCRIPTION OF THE INVENTION

<Configuration of Image Forming Apparatus 1>

Figure 1:
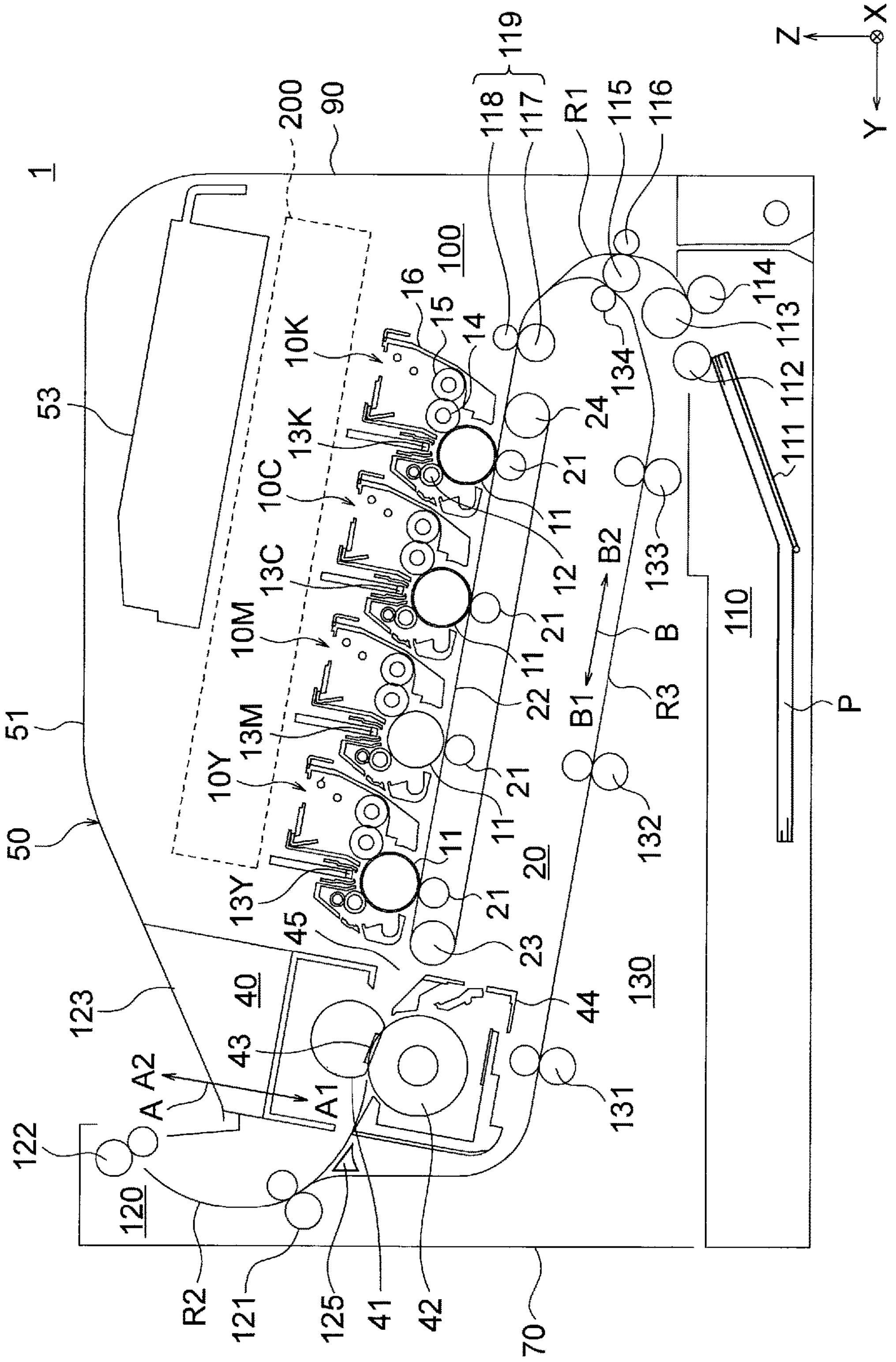
FIG. 1 is a diagram illustrating a configuration of an image forming apparatus of an embodiment.

FIG. 1 is a diagram illustrating a configuration of an image forming apparatus 1 of a present embodiment. The image forming apparatus 1 forms images by using an electrophotographic method and is configured here as a printer that forms color images.

As illustrated in FIG. 1, the image forming apparatus 1 includes a medium supply section 110, process units 10K, 10C, 10M, and 10Y, a transfer unit 20, a fixing unit 40, a medium ejection section 120, a housing 70, and a top cover unit 50. The medium supply section 110 supplies media P such as printing paper. The process units 10K, 10C, 10M, and 10Y form toner images (developer images). The transfer unit 20 transfers the toner image to the medium P. The fixing unit 40 fixes the toner image onto the medium P. The medium ejection section 120 ejects the medium P. The housing 70 accommodates therein these components described above. The top cover unit 50 is provided on the top of the housing 70.

The medium supply section 110 has a paper feeding tray 111 that stores the media P, a pickup roller 112 disposed to contact the medium P stored in the paper feeding tray 111, a feed roller 113 disposed adjacent to the pickup roller 112, and a retard roller 114 disposed to face the feed roller 113.

The paper feeding tray 111 stores a stack of the media P such as printing paper. The pickup roller 112 contacts the medium P in the paper feeding tray 111 and rotates to eject the medium P from the paper feeding tray 111. The feed roller 113 feeds the medium P ejected by the pickup roller 112 to a conveyance path R1. The retard roller 114 rotates in a direction opposite to a feeding direction taken by the feed roller 113 to apply conveyance resistance to the medium P to thereby prevents duplicate feeding.

The medium supply section 110 also has a registration roller pair composed of a registration roller 115 and a pinch roller 116, and a conveyance roller pair 119 composed of a conveyance roller 117 and a pinch roller 118, along the conveyance path R1 for the medium P. The registration roller 115 starts rotating at predetermined timing after a leading end of the medium P contacts nip portions of the registration roller pair, and thereby it corrects the skew of the medium P and conveys the medium P. The conveyance roller 117 conveys the medium P from the registration roller pair to the transfer unit 20.

The process units 10K, 10C, 10M, and 10Y (i.e., image forming units) are arranged in this order along a conveyance direction of the medium P. The process units 10K, 10C, 10M, and 10Y form black, cyan, magenta, and yellow toner images, respectively.

Exposure heads 13K, 13C, 13M, and 13Y (i.e., exposure devices) are disposed so as to face respective photosensitive drums 11 (to be described later) of the process units 10K, 10C, 10M, and 10Y, respectively.

The process units 10K, 10C, 10M, and 10Y are collectively referred to as “process units 10” when it is not necessary to distinguish them. The exposure heads 13K, 13C, 13M, and 13Y are collectively referred to as “exposure heads 13” when it is not necessary to distinguish them.

The process unit 10 has the photosensitive drum 11 as an image carrier that carries the toner image, a charging roller 12 as a charging member, a developing roller 14 as a developer carrier, and a supply roller 15 as a supply member.

The photosensitive drum 11 is a cylindrical member with a photosensitive layer (charge generation layer and charge transfer layer) provided on a surface of a conductive substrate, and is rotated by a drive motor clockwise as illustrated in FIG. 1.

The charging roller 12 is disposed to contact the surface of the photosensitive drum 11 and rotates following the rotation of the photosensitive drum 11. The charging roller 12 is applied with a charging voltage by a charging voltage power source, and uniformly charges the surface of the photosensitive drum 11. An electrostatic latent image is formed on the uniformly charged surface of the photosensitive drum 11 by irradiation with light from an exposure head 13.

The exposure head 13 includes, for example, a light-emitting element array in which light-emitting elements such as LEDs (light-emitting diodes) are arranged, and a lens array that focuses the light emitted from the light-emitting elements onto the surface of the photosensitive drum 11. The exposure head 13 causes the surface of the photosensitive drum 11 to be exposed to light, thereby forming the electrostatic latent image.

The developing roller 14 is disposed to contact the surface of the photosensitive drum 11 and rotates in the direction (counterclockwise in the figure) opposite to that of the photosensitive drum 11. The developing roller 14 is applied with a developing voltage by a developing voltage power source, and causes toner to adhere to the electrostatic latent image formed on the surface of the photosensitive drum 11, thereby forming a toner image.

The supply roller 15 is disposed to contact or face the surface of the developing roller 14 and rotates in the same direction (counterclockwise in the figure) as the developing roller 14. The supply roller 15 is applied with a supply voltage a supply voltage power source, and supplies the toner to the developing roller 14.

The transfer unit 20 is disposed under the process units 10K, 10C, 10M, and 10Y. The transfer unit 20 is also referred to as a belt unit.

Figure 2:
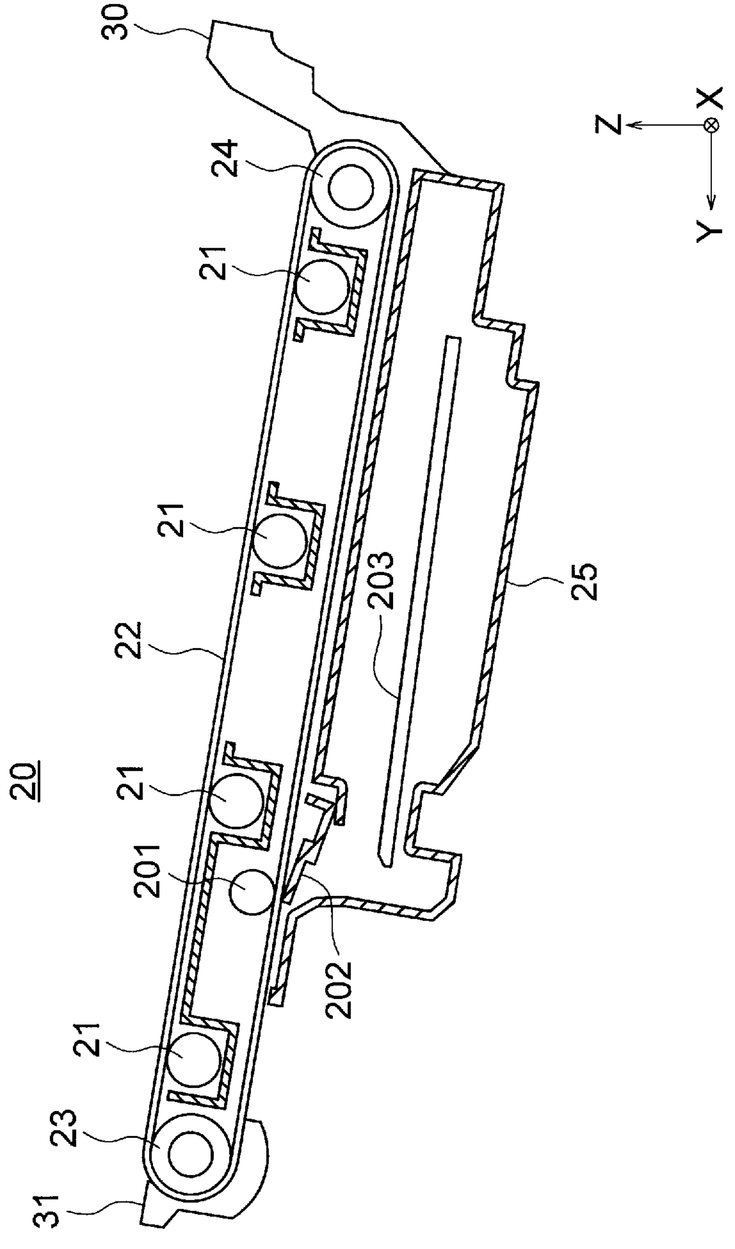
FIG. 2 is a diagram illustrating a configuration of a transfer unit of the embodiment.

FIG. 2 is a diagram illustrating the transfer unit 20. The transfer unit 20 includes: transfer rollers 21 facing the respective photosensitive drums 11 of the process units 10K, 10C, 10M, and 10Y, an endless transfer belt 22 that passes between the photosensitive drum 11 and the transfer rollers 21, and a drive roller 23 and a tension roller 24 around which the transfer belt 22 is stretched. The transfer belt 22 is also simply referred to as the belt.

The transfer roller 21 is applied with a transfer voltage by a transfer voltage power source, and transfers the toner image formed on the photosensitive drum 11 to the medium P. The transfer belt 22 travels with the medium P adsorbed and held on its surface by electrostatic force. The drive roller 23 rotates by means of a belt motor, causing the transfer belt 22 to travel. The tension roller 24 is a driven roller and applies tension to the transfer belt 22.

Under the transfer belt 22, a cleaning blade 202 is disposed in contact with an outer circumference of the transfer belt 22. On an inner circumference of the transfer belt 22, a backup roller 201 is disposed in a location where the transfer belt 22 is sandwiched between the cleaning blade 202 and the backup roller 201. In an example illustrated in FIG. 2, the backup roller 201 and the cleaning blade 202 are disposed, for example, between the two transfer rollers 21 located at the most downstream side in the conveyance direction of the medium P.

The cleaning blade 202 scrapes off the toner and the like adhering to the transfer belt 22. A waste toner box 25 that stores the toner scraped off by the cleaning blade 202 is disposed under the transfer belt 22.

The waste toner box 25 extends in the conveyance direction of the medium P, for example, from a position corresponding to the second transfer roller 21 counted from the most downstream side to a position corresponding to the tension roller 24. Within the waste toner box 25, a conveyor/agitator (agitation bar) 203 is provided to spread the toner scraped off by the cleaning blade 202 throughout the waste toner box 25.

As illustrated in FIG. 1, the fixing unit 40 is disposed downstream of the transfer unit 20 in the conveyance direction of the medium P. The fixing unit 40 has, for example, a fixing belt 41, a heater 43 disposed on the inner circumferential side of the fixing belt 41, a pressure roller 42 pressed against the fixing belt 41, and a unit housing 44 that accommodates therein these components.

The fixing belt 41 is heated from its inner circumferential side by the heater 43. The pressure roller 42 rotates with the driving force of a fixing motor, and the fixing belt 41 rotates following the pressure roller 42. The fixing belt 41 and the pressure roller 42 apply heat and pressure, respectively, to the toner image transferred to the medium P to fix the toner image onto the medium P. Instead of the fixing belt 41 and heater 43, a fixing roller with a built-in heat source may be used.

The medium ejection section 120 is disposed downstream of the fixing unit 40 in the conveyance direction of the medium P and includes two pairs of rollers, i.e., ejection rollers 121 and 122. The ejection rollers 121 and 122 convey the medium P fed from the fixing unit 40 along an ejection conveyance path R2 and then eject the medium P to the outside of the image forming apparatus 1. A stacker portion 123 for placing the media P ejected by the ejection rollers 121 and 122 is provided at the top of the top cover unit 50.

For double-sided printing, the image forming apparatus 1 is equipped with a re-conveyance section 130 that reverses the medium P with the toner image fixed on its surface and conveys the medium P back to the conveyance roller pair 119 described above. A switching guide 125 that guides the medium P fed from the fixing unit 40 to the medium ejection section 120 or re-conveyance section 130 is provided downstream of the fixing unit 40.

The re-conveyance section 130 has a return conveyance path R3 that merges with the conveyance path R1 on the upstream side of the conveyance roller pair 119. Along the return conveyance path R3, conveyance rollers 131, 132, and 133 are provided. A pinch roller 134 is provided near an exit of the return conveyance path R3 so as to contact the registration roller 115 from the opposite side to the pinch roller 116.

The conveyance rollers 131 to 133 convey the medium P along the return conveyance path R3. The roller pair of the registration roller 115 and the pinch roller 134 convey the medium P that has been conveyed along the return conveyance path R3 to the conveyance roller pair 119. In a case where the image forming apparatus 1 does not have the function of double-sided printing, the re-conveyance section 130 is not necessarily provided.

The image forming apparatus 1 also has the top cover unit 50 as a cover member that is openable and closable and mounted at the top of the housing 70, and a front cover 90 that is openable and closable and mounted onto a side portion of the housing 70.

The top cover unit 50 has toner cartridges 53K, 53C, 53M, and 53Y (see FIG. 4 to be described later) as developer storages that supply toner to the process units 10K, 10C, 10M, and 10Y, respectively. The toner cartridges 53K, 53C, 53M, and 53Y store black, cyan, magenta, and yellow toner, respectively. The top cover unit 50 is also provided with an operation panel 71 (FIG. 3) for performing an input operation to the image forming apparatus 1.

In FIG. 1, the direction of the rotation axis of the photosensitive drum 11 is defined as the X direction. The X direction is the width direction of the medium P. The axis direction of each roller in each unit described above is parallel to the X direction. The depth (front-rear) direction of the image forming apparatus 1 that is perpendicular to the X direction is defined as the Y direction. The XY plane here is the horizontal plane. The direction perpendicular to the XY plane, here the vertical direction, is defined as the Z direction. Specifically, the Y direction toward the side of the front cover 90 is defined as the −Y direction (rearward), whereas the direction toward its opposite side is the +Y direction (forward).

In FIG. 1, the process units 10K, 10C, 10M, and 10Y are arranged in a direction inclined by about 10 degrees relative to the Y direction. The arrangement direction of the transfer rollers 21 of the transfer unit 20 is parallel to the arrangement direction of the process units 10K, 10C, 10M, and 10Y. However, these arrangement directions do not necessarily have to be inclined relative to the Y direction, and may be parallel to the Y direction.

Of the components of the image forming apparatus 1, the fixing unit 40 is configured to be attachable to and detachable from the housing 70 in the directions indicated by arrows A1 and A2, respectively. The direction indicated by the arrow A1 is the attachment direction (first direction), whereas the direction indicated by the arrow A2 is the detachment direction. These directions are collectively referred to as the attachment/detachment direction (A direction) of the fixing unit 40.

The attachment/detachment direction (A direction) of the fixing unit 40 is here inclined by about 10 degrees relative to the Z direction. That is, the attachment direction of the fixing unit 40 is substantially −Z direction, and the detachment direction of the fixing unit 40 is substantially +Z direction. However, the attachment/detachment direction of the fixing unit 40 is not limited to this direction.

The transfer unit 20 is configured to be attachable to and detachable from the housing 70 in the directions indicated by arrows B1 and B2, respectively. The direction indicated by the arrow B1 is defined as the attachment direction (second direction), whereas the direction indicated by the arrow B2 is the detachment direction. These directions are collectively referred to as the attachment/detachment direction (B direction) of the transfer unit 20.

The attachment/detachment direction (B direction) of the transfer unit 20 is here inclined by about 10 degrees relative to the Y direction. That is, the attachment direction of the transfer unit 20 is substantially +Y direction, and the detachment direction of the transfer unit 20 is substantially −Y direction. However, the attachment/detachment direction of the transfer unit 20 is not limited to this direction.

The attachment/detachment direction (A direction) of the fixing unit 40 and the attachment/detachment direction (B direction) of the transfer unit 20 are perpendicular to each other in an example illustrated in FIG. 1. However, these directions do not necessarily have to be perpendicular to each other, and they only need to intersect each other.

The portion of the image forming apparatus 1, excluding the transfer unit 20, fixing unit 40, top cover unit 50, and front cover 90, is referred to as an apparatus body 100. The apparatus body 100 includes the housing 70, the medium supply section 110, the process units 10K, 10C, 10M, and 10Y, the medium ejection section 120, and the like.

Figure 3:
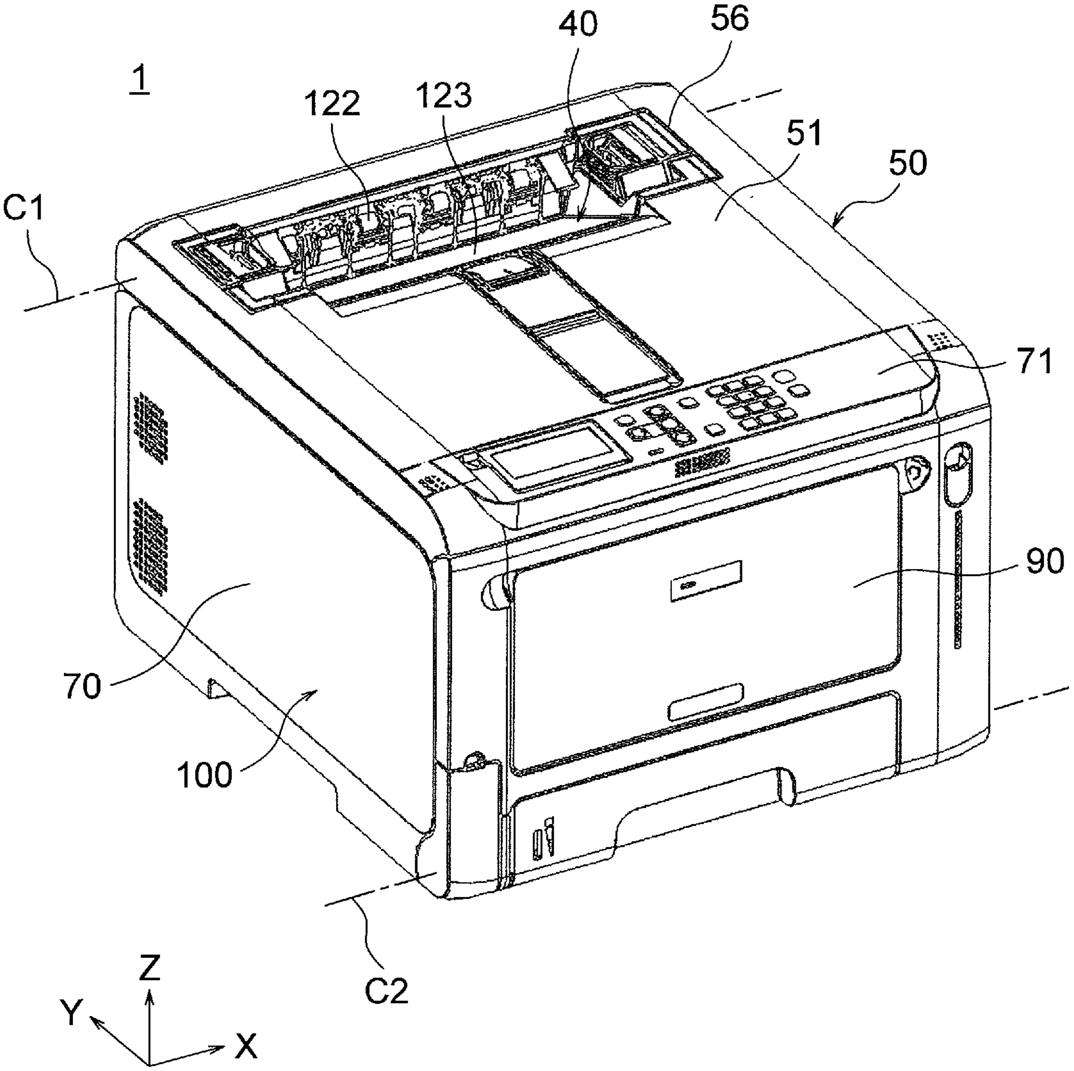
FIG. 3 is a perspective view illustrating an appearance of the image forming apparatus of the embodiment.

FIG. 3 is a perspective view illustrating an appearance of the image forming apparatus 1. The top cover unit 50 is provided on the housing 70 so as to be rotatable about a rotation axis C1 in the X direction. The rotation axis C1 is provided at an end (front end) of the housing 70 in the +Y direction and at an end (top end) thereof in the +Z direction.

The front cover 90 is provided on the housing 70 so as to be rotatable about a rotation axis C2 in the X direction. The rotation axis C2 is provided at an end (rear end) of the housing 70 in the −Y direction and at an end (bottom end) thereof in the −Z direction.

Figure 4:
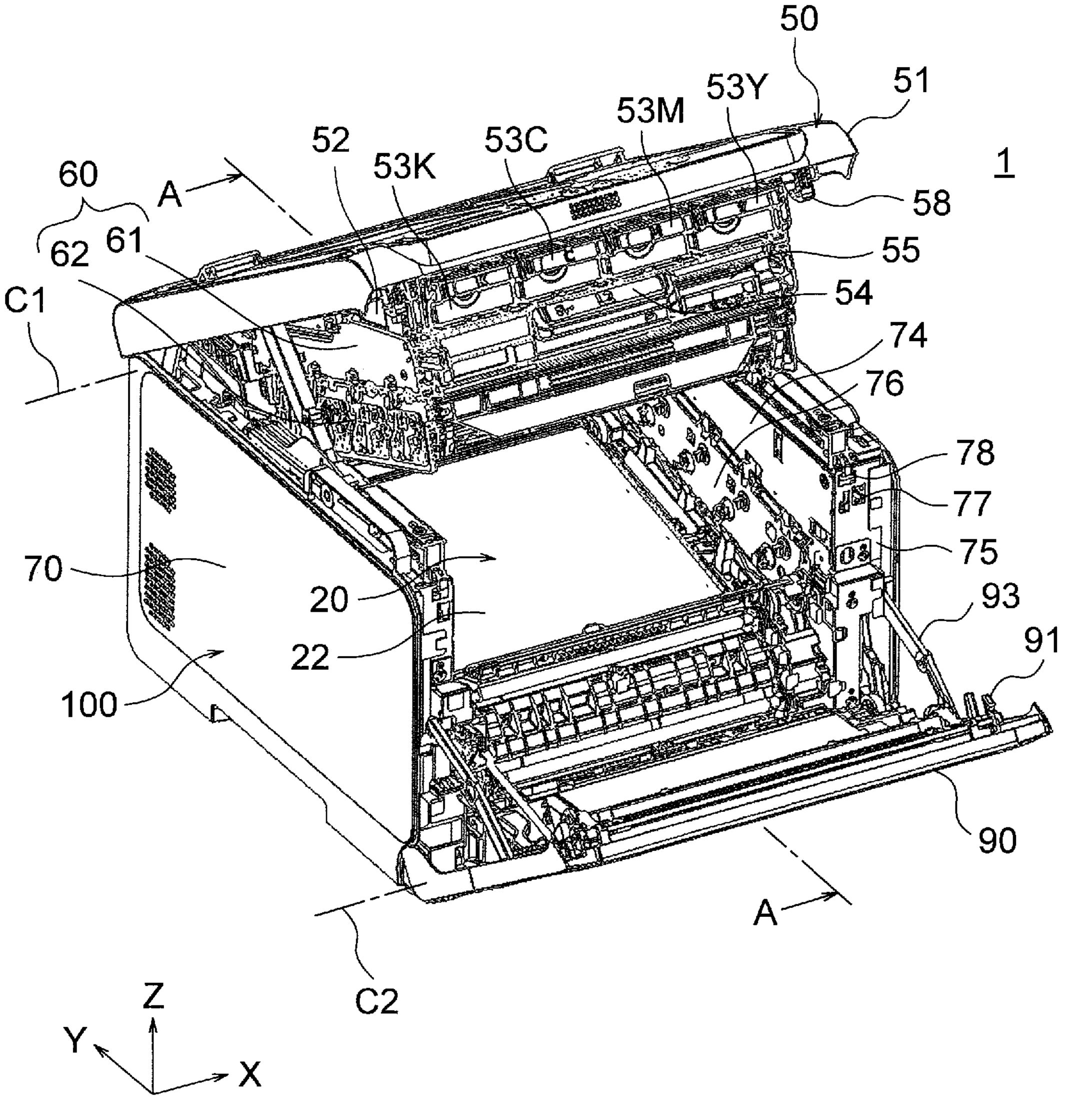
FIG. 4 is a perspective view illustrating a state in which a top cover unit and a front cover in the image forming apparatus of the embodiment are opened.

FIG. 4 is a perspective view illustrating a state in which the top cover unit 50 and the front cover 90 in the image forming apparatus 1 both are rotated to respective open positions. The top cover unit 50 is rotatable between a closed position illustrated in FIG. 3 and the open position shown in FIG. 4. The front cover 90 is rotatable between a closed position illustrated in FIG. 3 and the open position shown in FIG. 4.

Of the components of the image forming apparatus 1, the toner cartridges 53K, 53C, 53M, and 53Y and the exposure heads 13K, 13C, 13M, and 13Y (FIG. 1) are held by the top cover unit 50.

The top cover unit 50 has a unit frame 52 that is rotatable about the rotation axis C1 and a cover 51 that covers the top of the unit frame 52.

The unit frame 52 holds the toner cartridges 53K, 53C, 53M, and 53Y arranged in the X direction such that each of these toner cartridges 53K, 53C, 53M, and 53Y can be pulled out therefrom. The cover 51 is provided with an opening 56 (FIG. 3) for attaching and detaching the fixing unit 40 to and from the housing 70.

The unit frame 52 is provided with a toner conveyance path 200 (FIG. 1) for conveying toner from the toner cartridges 53K, 53C, 53M, and 53Y to the process units 10K, 10C, 10M, and 10Y.

The image forming apparatus 1 also has a basket unit 60 that holds the process units 10K, 10C, 10M, and 10Y. The basket unit 60 has a rotatable frame 61 that is rotatable about the rotation axis C2 described above, and a basket 62 held by the rotatable frame 61. The basket 62 holds the process units 10K, 10C, 10M, and 10Y.

The top cover unit 50 and the basket unit 60 are rotatable in a state where the top cover unit 50 and the basket unit 60 are connected to each other. However, it is also possible that only the top cover unit 50 is rotatable alone. The top cover unit 50 is provided with a first operation lever 54 and a second operation lever 55. The first operation lever 54 is operated when the top cover unit 50 is opened or closed. The second operation lever 55 is operated when the connection state between the top cover unit 50 and the basket unit 60 is switched.

The first operation lever 54 is interlocked with a locking portion 58 provided on the unit frame 52. When the top cover unit 50 is located in the closed position, the locking portion 58 is engaged with a hole 78 formed in an end surface portion 75 of the housing 70. That is, the top cover unit 50 is locked in the closed position with respect to the housing 70. When the first operation lever 54 is pulled out, the locking portion 58 is moved out of the hole 78 in the housing 70 to unlock the top cover unit 50.

The second operation lever 55 is operated to connect and disconnect the top cover unit 50 and the basket unit 60. In a state where the second operation lever 55 is pushed in, the top cover unit 50 and the basket unit 60 are connected together. On the other hand, in a state where the second operation lever 55 is pulled out, the top cover unit 50 and the basket unit 60 are disconnected.

The second operation lever 55 is also interlocked with a shutter (not shown) that opens and closes the toner conveyance path 200 through which toner is supplied from the toner cartridges 53K, 53C, 53M, and 53Y to the process units 10K, 10C, 10M, and 10Y.

In a state where the second operation lever 55 is pushed in, the toner can be supplied from the toner cartridges 53K, 53C, 53M, and 53Y to the process units 10K, 10C, 10M, and 10Y via the toner conveyance path 200. In a state where the second operation lever 55 is pulled out, the supply of the toner via the toner conveyance path 200 is blocked.

Figure 5:
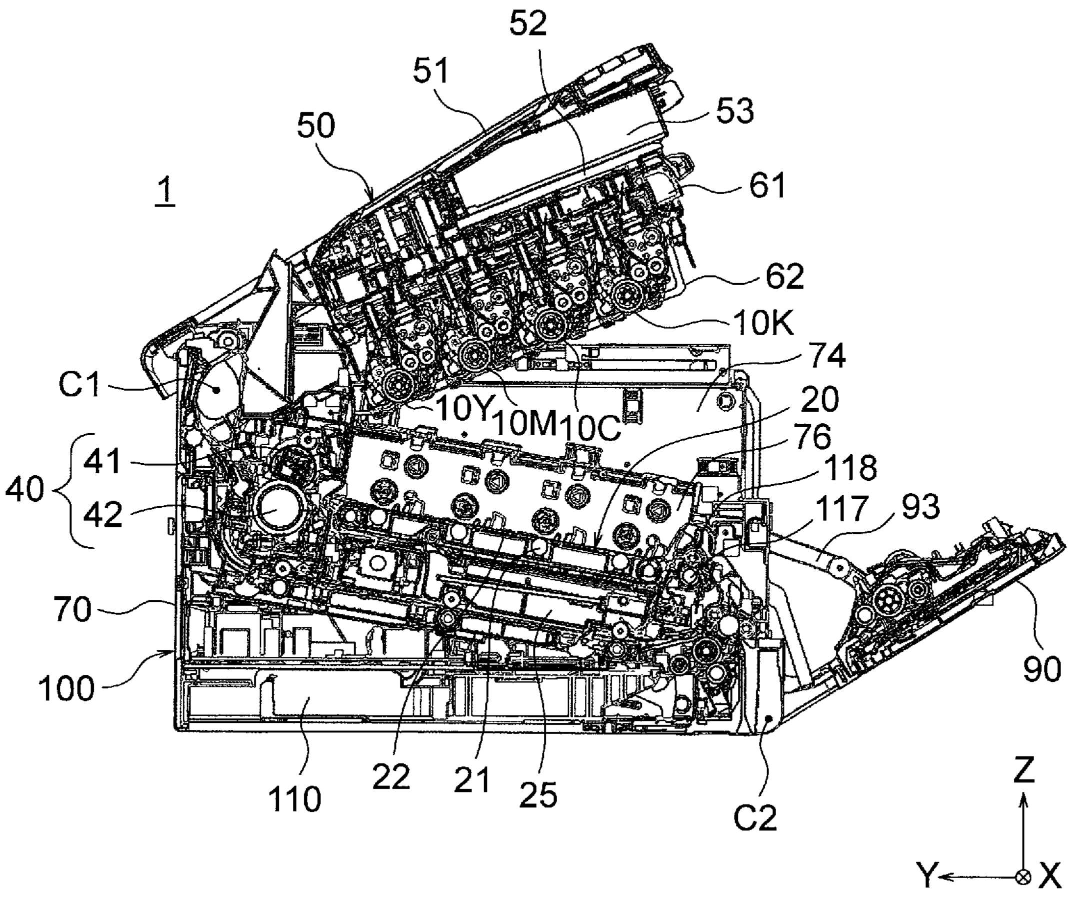
FIG. 5 is a side cross-sectional view illustrating the state in which the top cover unit and the front cover in the image forming apparatus of the embodiment are opened.

In the state illustrated in FIGS. 4 and 5, the second operation lever 55 is pushed in, and the top cover unit 50 and the basket unit 60 are rotated to the open position in a state where they are connected together.

By the rotation of the top cover unit 50 and basket unit 60 to the open position, the top of the transfer unit 20 is opened, and the transfer unit 20 can be detached from the housing 70.

A description of the specific configuration of the top cover unit 50 and the basket unit 60 will be omitted. The image forming apparatus 1 is not limited to that having the top cover unit 50 and basket unit 60 as described above. For example, the image forming apparatus 1 may be configured such that toner cartridges are attachable to and detachable from the process units 10K, 10C, 10M, and 10Y.

<Configuration of Transfer Unit 20>

Figure 6:
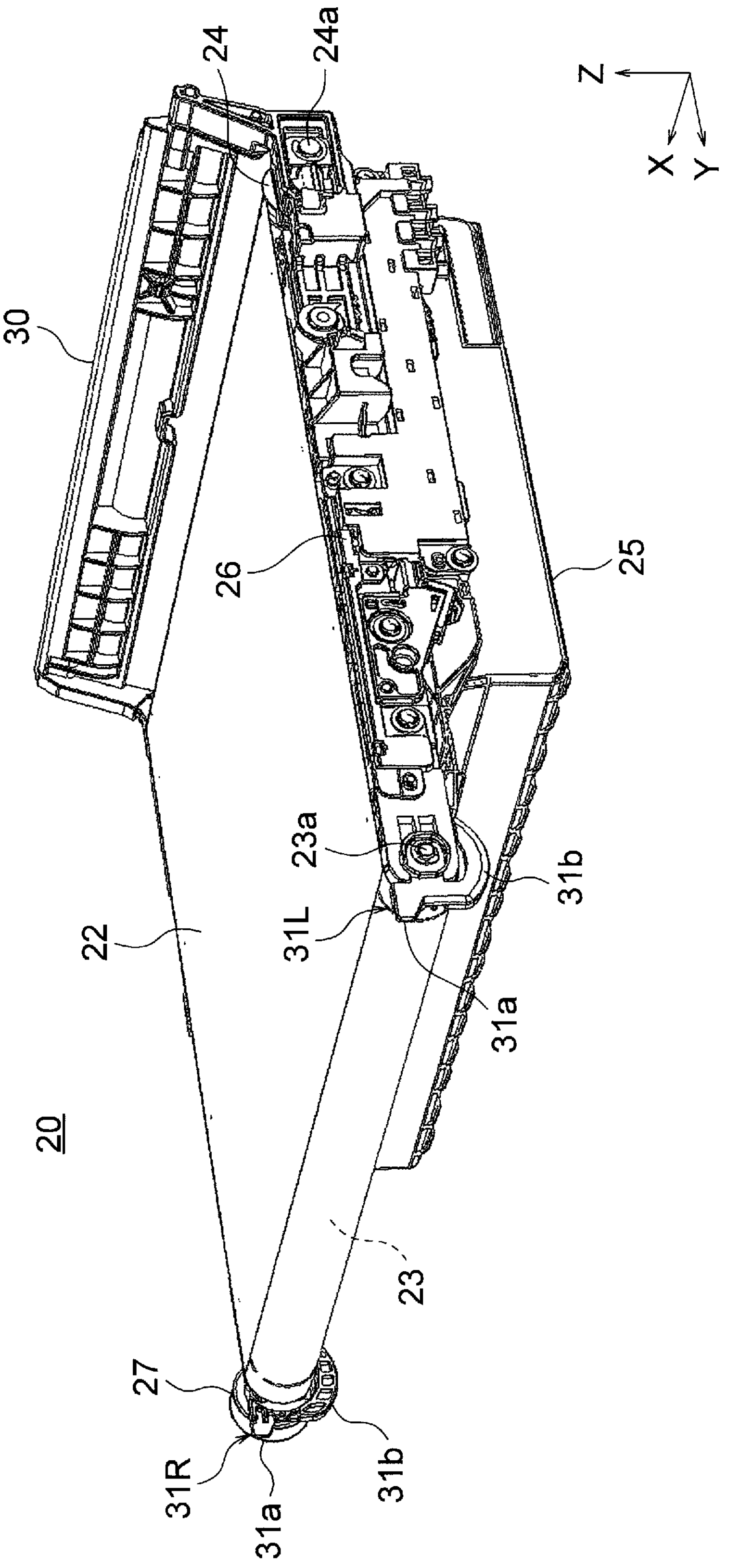
FIG. 6 is a perspective view illustrating the transfer unit of the embodiment.

FIG. 6 is a perspective view illustrating the transfer unit 20. The transfer unit 20 has a belt frame 26 that supports the transfer belt 22 and four transfer rollers 21 (FIG. 2). The extending direction of the belt frame 26 is substantially the Y direction in a state where the transfer unit 20 is attached to the housing 70.

On the lower side of the belt frame 26, the waste toner box 25 described above is provided. Meanwhile, on the upper side of the belt frame 26, a gripping portion 30 to be gripped by a user upon attachment or detachment of the transfer unit 20 is provided. The gripping portion 30 is located at the end (rear end) of the belt frame 26 substantially in the −Y direction and extends in the X direction.

Figure 7A:
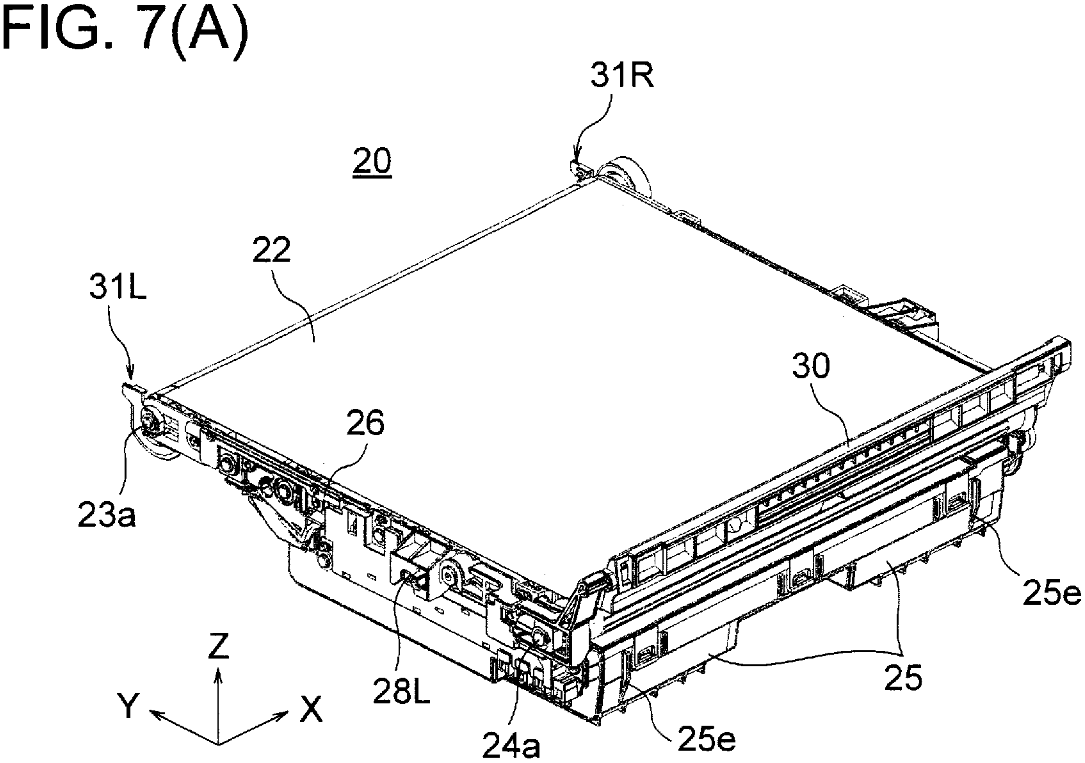
FIG. 7(A) is a perspective view illustrating the transfer unit of the embodiment.
Figure 7B:
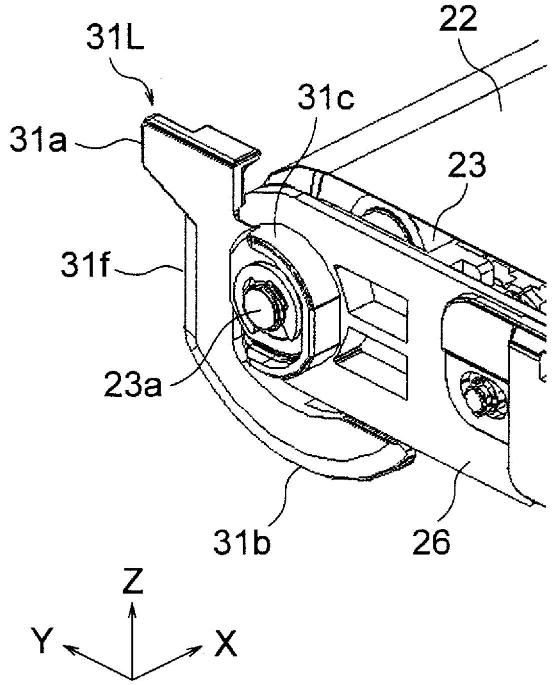
FIG. 7(B) is an enlarged perspective view illustrating a part of the transfer unit.
Figure 8A:
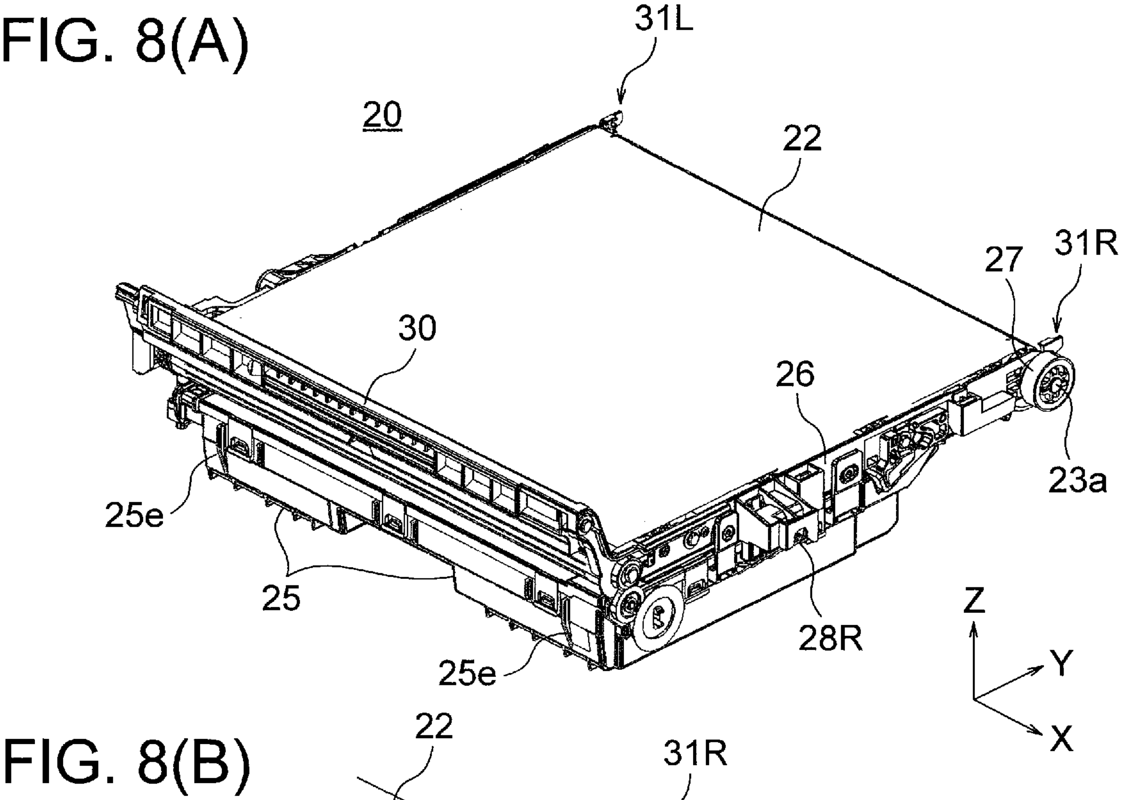
FIG. 8(A) is a perspective view illustrating the transfer unit of the embodiment.
Figure 8B:
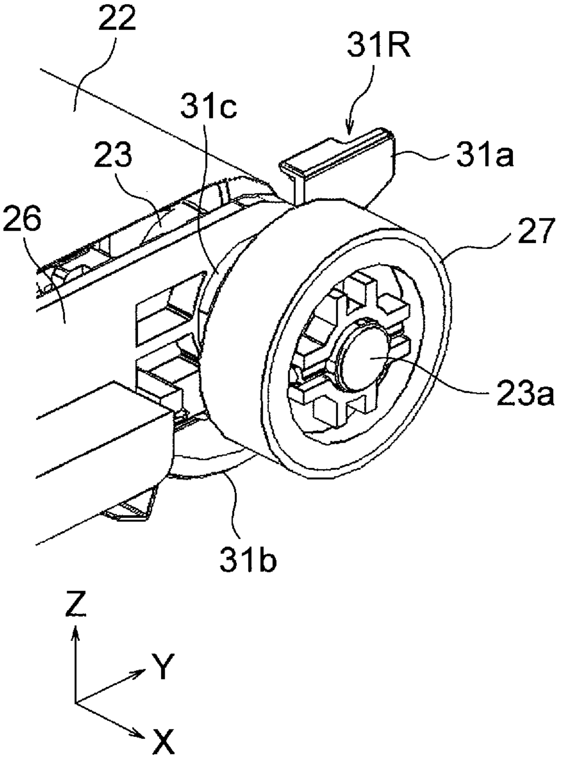
FIG. 8(B) is an enlarged perspective view illustrating a part of the transfer unit.

FIG. 7(A) is a perspective view of the transfer unit 20 as viewed from the left rear side. FIG. 7(B) is an enlarged perspective view of a part of the transfer unit 20 illustrated in FIG. 7(A). FIG. 8(A) is a perspective view of the transfer unit 20 as viewed from the right rear side. FIG. 8(B) is an enlarged perspective view of a part of the transfer unit 20 illustrated in FIG. 8(A).

As illustrated in FIG. 7(A), on the −X side of the belt frame 26, a U-shaped groove 28L opened substantially in the −Z direction is formed at the center region substantially in the Y direction. The U-shaped groove 28L serves as a positioning portion that positions the transfer unit 20 by engaging a post 84L (FIG. 11(B)) provided inside the housing 70.

As illustrated in FIG. 8(A), a U-shaped groove 28R opened substantially in the −Z direction is formed on the +X side of the belt frame 26. The U-shaped groove 28R by engages a post 84R (FIG. 12(B)) provided inside the housing 70 and serves as a positioning portion that positions the transfer unit 20.

As illustrated in FIGS. 7(A) and 8(A), the transfer unit 20 has bearing portions 31L and 31R on both sides of the transfer belt 22 in the X direction. The bearing portions 31L and 31R are located substantially in the +Y side (forward) of the transfer belt 22.

The bearing portion 31L is mounted on the −X side of the belt frame 26 and rotatably supports a shaft 23*a* of the drive roller 23 as illustrated in an enlarged view of FIG. 7(B). The bearing portion 31L is formed of resin, such as polyacetal (POM), for example.

The bearing portion 31R is mounted on the +X side of the belt frame 26 and rotatably supports the shaft 23*a* of the drive roller 23 as illustrated in an enlarged view of FIG. 8(B). The bearing portion 31L is formed of resin, such as POM, for example.

At the end of the drive roller 23 in the +X direction, a gear 27 is fixed to transmit rotation from the belt motor to the drive roller 23.

Figure 9A:
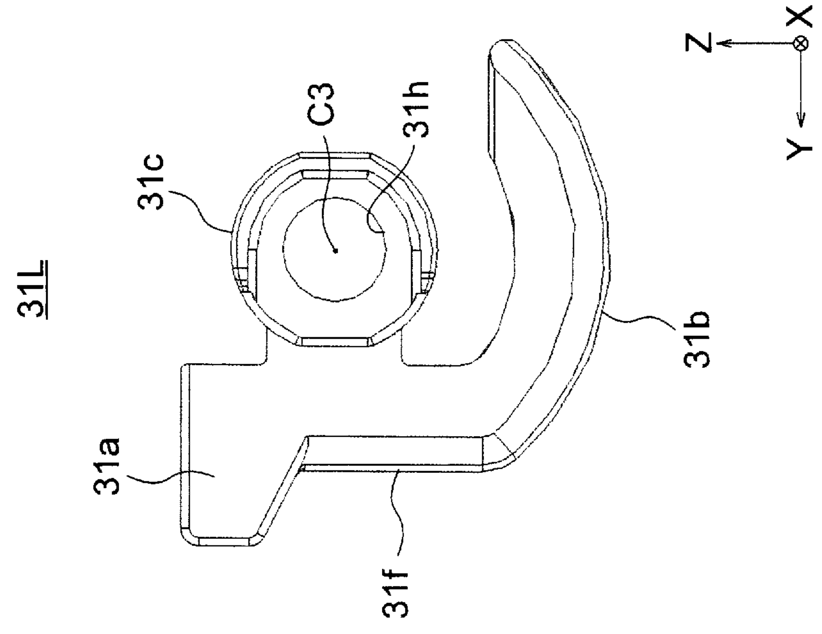
FIGS. 9(A) and 9(B) are diagrams of one of bearing portions of the transfer unit of the embodiment as viewed from −X and +X sides, respectively.
Figure 9B:
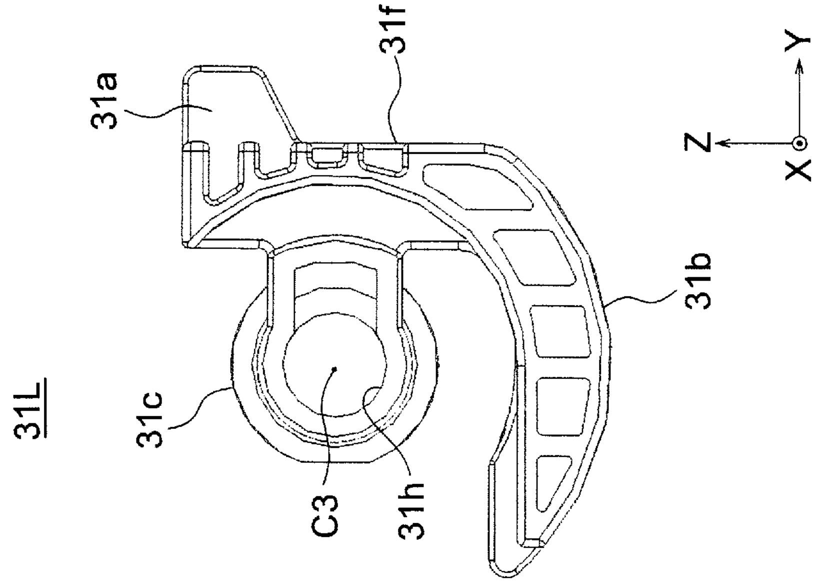

FIG. 9(A) is a diagram of the bearing portion 31L as viewed from the −X side. FIG. 9(B) is a diagram of the bearing portion 31L as viewed from the +X side. As illustrated in FIGS. 9(A) and 9(B), the bearing portion 31L has a fitting portion 31*c* that supports the shaft 23*a* (FIG. 7(B)) of the drive roller 23. The fitting portion 31*c* is formed substantially in an annular shape about a rotation axis C3.

The fitting portion 31*c* has a support hole 31*h* into which the shaft 23*a* is inserted. The support hole 31*h* is a circular hole about the rotation axis C3 of the shaft 23*a*. The fitting portion 31*c* also engages a positioning groove 82L (FIG. 11(B)) serving as a first engagement portion to be described later when the transfer unit 20 is attached. Therefore, the fitting portion 31*c* is also referred to as a second engagement portion.

The bearing portion 31L also has an arm 31*f* located on substantially the +Y side of the fitting portion 31*c*, a protrusion 31*a* as a restricting portion protruding from the arm 31*f* substantially in the +Y direction, and a guide portion 31*b* extending in an arc shape substantially in the −Z direction (downward) from the arm 31*f*.

The protrusion 31*a* is a contact portion that contacts the unit housing 44 of the fixing unit 40 when the transfer unit 20 is incorrectly attached. The protrusion 31*a* is a plate-shaped member having a thickness in the X direction and is elastically deformable in the X direction.

The guide portion 31*b* is formed in an arc shape about the rotation axis C3. The guide portion 31*b* is a sliding portion that slides along a guide rail 81L (FIG. 11(B)) to be described later when the transfer unit 20 is attached.

Figure 10B:
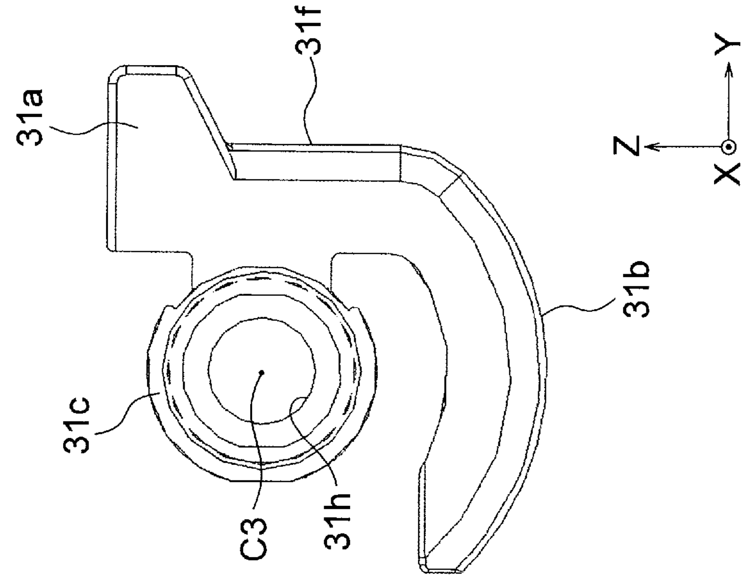
FIGS. 10(A) and 10(B) are diagrams of the other bearing portion of the transfer unit of the embodiment as viewed from −X and +X sides, respectively.
Figure 10A:
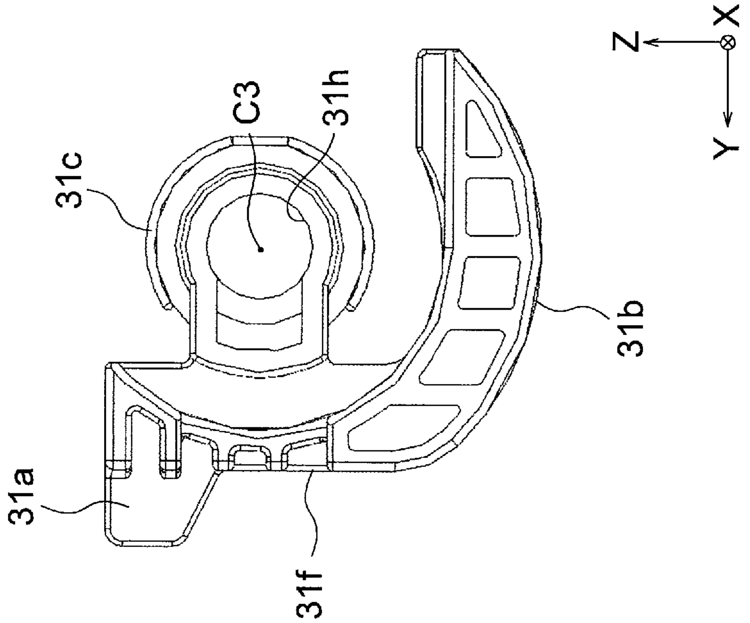

FIG. 10(A) is a diagram of the bearing portion 31R as viewed from the −X side. FIG. 10(B) is a diagram of the bearing portion 31R as viewed from the +X side. As illustrated in FIGS. 10(A) and 10(B), the bearing portion 31R has a shape symmetrical to the bearing portion 31L relative to the YZ plane. That is, the bearing portion 31R has the protrusion 31*a* as the restricting portion, the guide portion 31*b*, the fitting portion 31*c* as the second engagement portion, and the arm 31*f*.

The protrusion 31*a* is a contact portion that contacts the fixing unit 40 when the transfer unit 20 is incorrectly attached. The guide portion 31*b* is a sliding portion that slides along a guide rail 81R (FIG. 12(B)) when the transfer unit 20 is attached. The fitting portion 31*c* has the support hole 31*h* and thereby supports the shaft 23*a* (FIG. 8(B)) of the drive roller 23. The fitting portion 31*c* also engages a positioning groove 82R (FIG. 12(B)) to be described later when the transfer unit 20 is attached.

As illustrated in FIGS. 7(A) and 8(A), ribs 25*e* are formed near both ends of the waste toner box 25 in the X direction at the end surface thereof in the −Y direction. The ribs 25*e* contact a roller frame 85 (FIG. 17(B)) in the housing 70 when the transfer unit 20 is incorrectly attached.

Figure 11A:
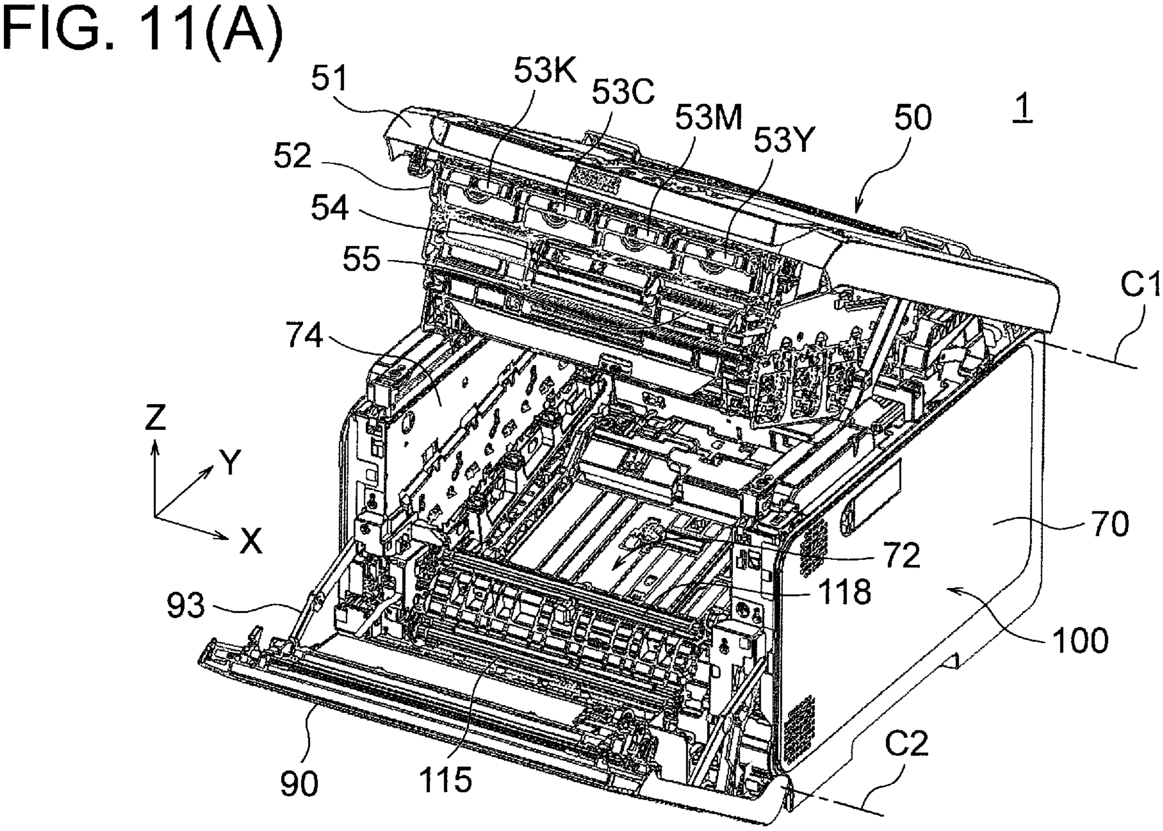
FIG. 11(A) is a perspective view illustrating a state in which the transfer unit is detached from a housing of the image forming apparatus of the embodiment.
Figure 11B:
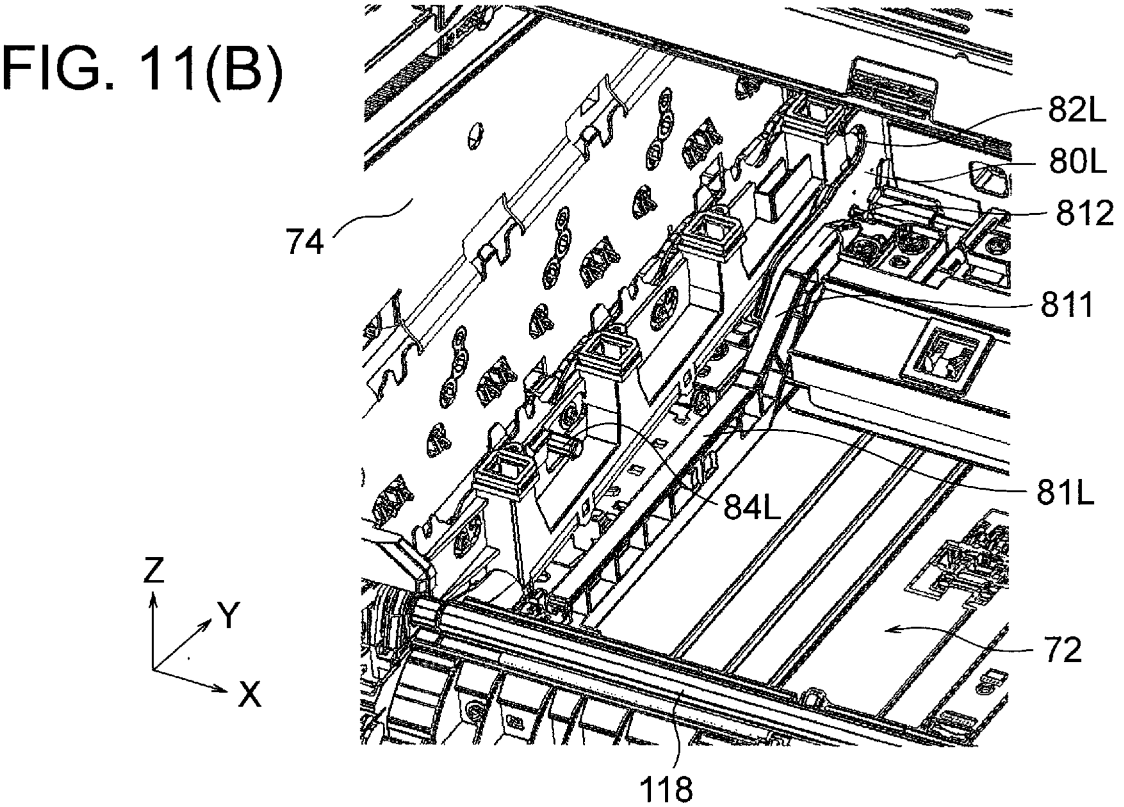
FIG. 11(B) is an enlarged perspective view illustrating a part of the housing.

FIG. 11(A) is a perspective diagram illustrating a state in which the transfer unit 20 is detached from the housing 70 of the image forming apparatus 1. FIG. 11(B) is an enlarged perspective diagram illustrating a part of the housing 70 illustrated in FIG. 11(A).

As illustrated in FIG. 11(A), an accommodation area 72 for accommodating the transfer unit 20 is formed inside the housing 70. The accommodation area 72 is formed between side walls 74 on both sides of the housing 70 in the X direction.

As illustrated in FIG. 11(B), the guide rail 81L is provided at an end of the accommodation area 72 in the −X direction. The guide rail 81L extends substantially in the Y direction, i.e., in the second direction described above. The guide rail 81L is a guide member that guides the guide portion 31*b* (FIG. 7(B)) of the bearing portion 31L of the transfer unit 20.

The guide rail 81L has a slope 811 and a top portion 812 at a region substantially in the +Y direction (forward) from the central region of the guide rail 81L. The slope 811 is inclined upward, and the top portion 812 leads to a front end of the slope 811.

The positioning groove 82L (i.e., a first engagement portion) is formed adjacent to the guide rail 81L. The positioning groove 82L engages the fitting portion 31*c* (FIG. 9(B)) of the bearing portion 31L of the transfer unit 20. The positioning groove 82L is, for example, a U-shaped groove opened substantially in the −Y direction.

The positioning groove 82L is formed at a position where the fitting portion 31*c* (FIG. 9(B)) is fitted to the positioning groove 82L when the guide portion 31*b* (FIG. 9(B)) of the bearing portion 31L reaches the top portion 812 of the guide rail 81L. The positioning groove 82L is formed, for example, in a plate 80L disposed adjacent to the guide rail 81L in the −X direction.

The post 84L that engages the U-shaped groove 28L (FIG. 7(A)) of the transfer unit 20 is provided inside the housing 70. The post 84L is, for example, a shaft member whose axial direction is the X direction. The engagement between the post 84L and the U-shaped groove 28L positions the transfer unit 20 substantially in the Y direction.

Figure 12A:
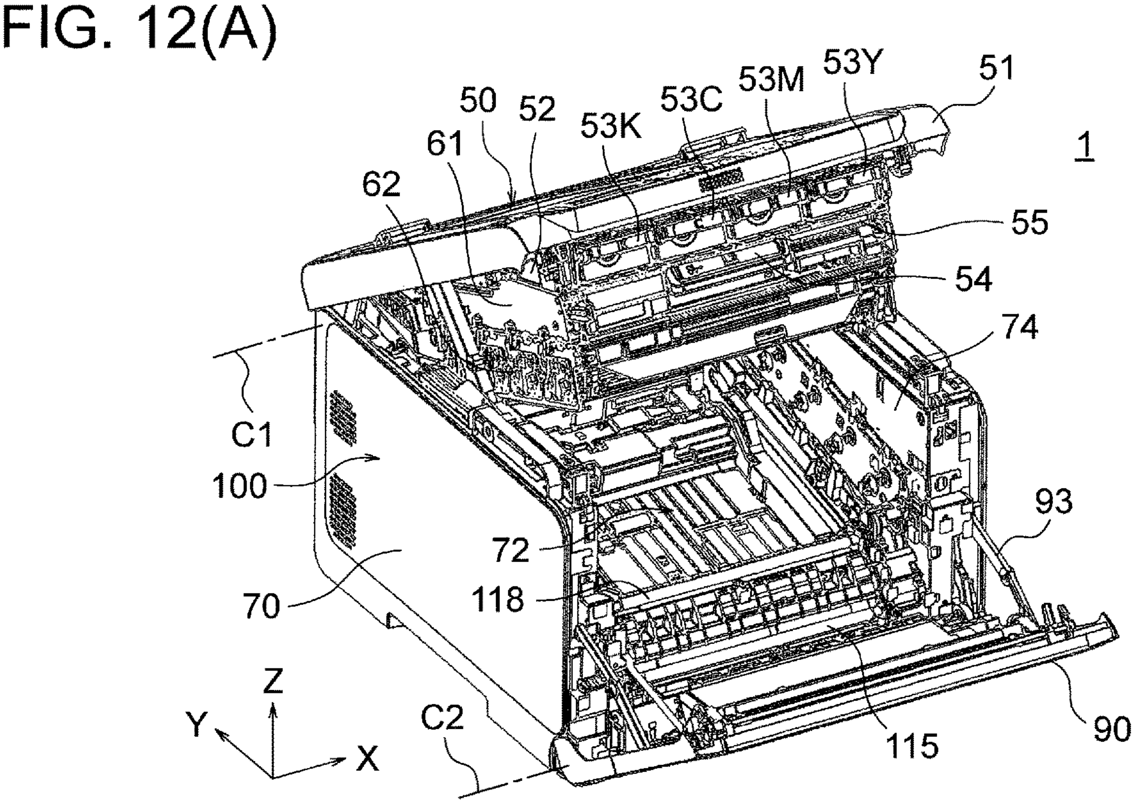
FIG. 12(A) is a perspective view illustrating a state in which the transfer unit is detached from the housing of the image forming apparatus of the embodiment.
Figure 12B:
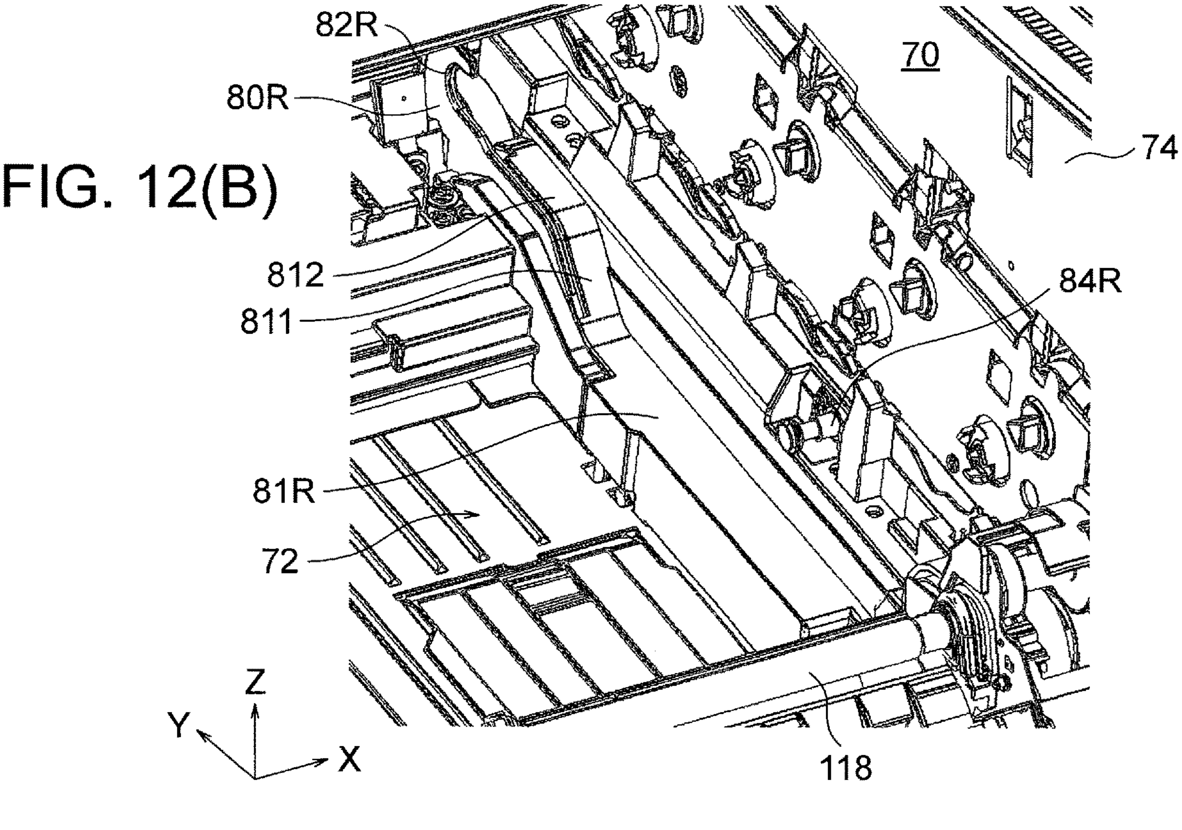
FIG. 12(B) is an enlarged perspective view illustrating a part of the housing.

FIG. 12(A) is a perspective diagram illustrating a state in which the transfer unit 20 is detached from the housing 70 of the image forming apparatus 1 as viewed from the opposite side to FIG. 11(A). FIG. 12(B) is an enlarged perspective diagram illustrating a part of the housing 70 illustrated in FIG. 12(A).

As illustrated in FIG. 12(B), the guide rail 81R is provided at an end of the accommodation area 72 in the +X direction. The guide rail 81R extends substantially in the Y direction, i.e., in the second direction described above. The guide rail 81R is a guide member that guides the guide portion 31*b* (FIG. 8(B)) of the bearing portion 31R of the transfer unit 20. The guide rail 81R has a slope 811 and a top portion 812, as in the guide rail 81L described above.

The positioning groove 82R (as the first engagement portion) is formed adjacent to the guide rail 81R. The positioning groove 82R engages the fitting portion 31*c* (FIG. 10(A)) of the bearing portion 31R of the transfer unit 20. The positioning groove 82R is, for example, a U-shaped groove opened substantially in the −Y direction.

The positioning groove 82R is formed at a position where the fitting portion 31*c* (FIG. 10(B)) is fitted to the positioning groove 82R when the guide portion 31*b* (FIG. 10(B)) of the bearing portion 31R reaches the top portion 812 of the guide rail 81R. The positioning groove 82R is formed, for example, in a plate 80R disposed adjacent to the guide rail 81R in the −X direction.

The post 84R that engages the U-shaped groove 28R (FIG. 8(A)) of the transfer unit 20 is provided inside the housing 70. The post 84R is, for example, a shaft member whose axial direction is the X direction The engagement between the post 84R and the U-shaped groove 28R positions the transfer unit 20 in the X direction and substantially in the Y direction.

Figure 13:
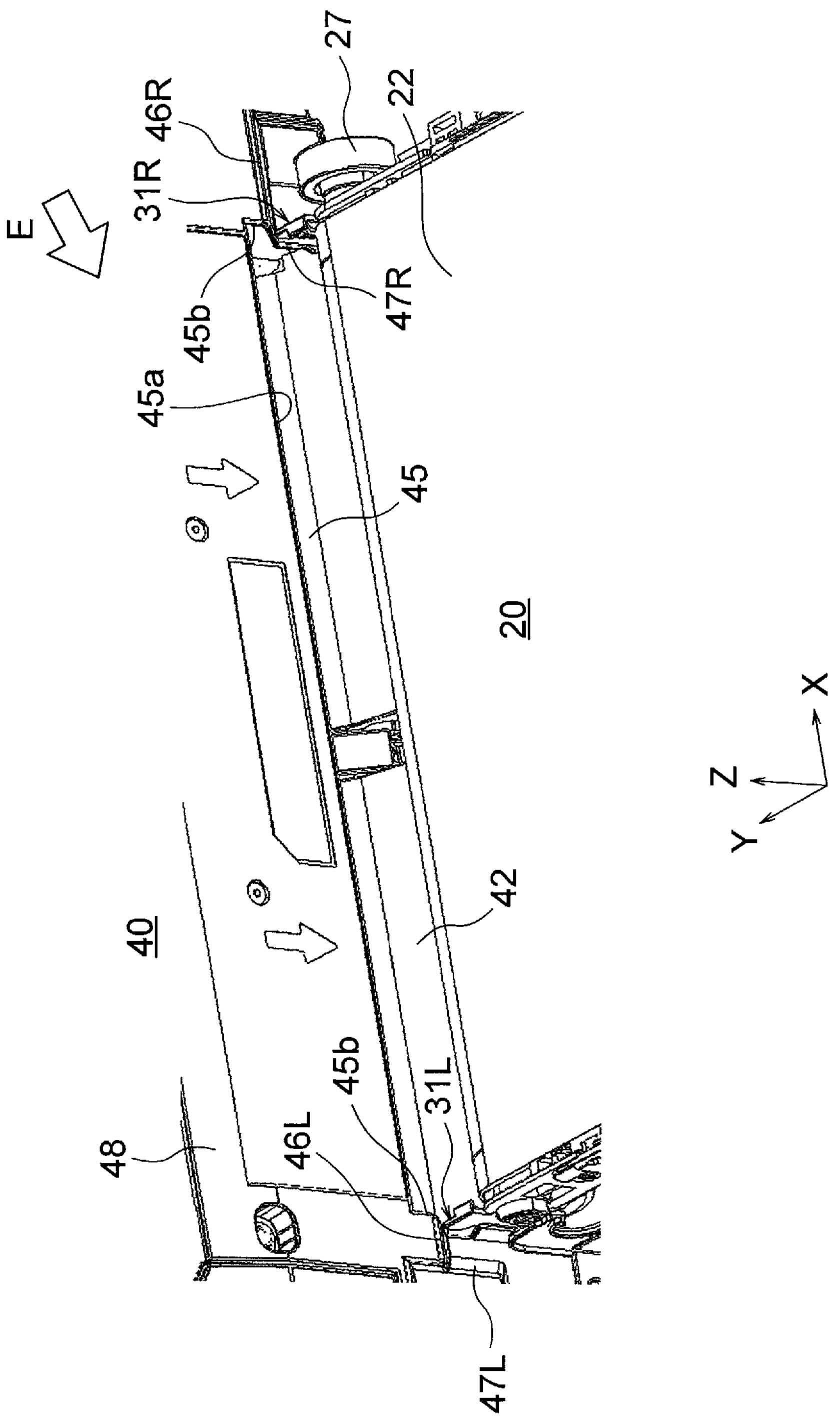
FIG. 13 is a perspective view illustrating an inlet opening of a fixing unit and its surroundings of the image forming apparatus of the embodiment.

FIG. 13 is a perspective view illustrating a part of the fixing unit 40. An inlet opening 45 is formed in a wall portion 48 of the unit housing 44 in the fixing unit 40. The wall portion 48 faces the transfer unit 20. The inlet opening 45 is an opening for introducing the medium P conveyed by the transfer belt 22 of the transfer unit 20 into the unit housing 44.

The inlet opening 45 has a rectangular shape that is elongated in the X direction. The inlet opening 45 has a restriction surface 45*a* as a second contact portion which is an end of the inlet opening 45 substantially in the +Z direction, and a pair of end surfaces 45*b* located at both ends of the inlet opening 45 in the X direction. The width of the inlet opening 45 in the X direction is wider than the width of the transfer belt 22.

Inclined surfaces 46L and 46R are provided on both sides of the inlet opening 45 in the X direction. The inclined surfaces 46L and 46R are inclined so as to be positioned in substantially the +Y direction along substantially the −Z direction (see FIGS. 15(A) and 15(B) to be described later).

Retracted surfaces 47L and 47R are formed to be continuous to lower ends (ends substantially in the −Z direction) of the inclined surfaces 46L and 46R, respectively. The retracted surfaces 47L and 47R are parallel to the wall portion 48 of the unit housing 44 and are retracted substantially in the +Y direction from the wall portion 48.

<Operation of Image Forming Apparatus>

Next, an image forming operation (printing operation) of the image forming apparatus 1 will be described with reference to FIG. 1. A controller of the image forming apparatus 1 starts the image forming operation when the controller receives a printing command and print data from a host device.

First, the pickup roller 112 ejects the medium P stored in the paper feeding tray 111, and the feed roller 113 feeds the ejected medium P to the conveyance path R1. The retard roller 114 applies conveyance resistance to the medium P, thereby preventing duplicate feeding. The registration roller 115 and the conveyance roller 117 rotate to convey the medium P fed into the conveyance path R1 to the transfer unit 20.

In the transfer unit 20, the drive roller 23 rotates to cause the transfer belt 22 to travel. The transfer belt 22 adsorbs and holds the medium P and conveys the medium P. The medium P passes through the process units 10K, 10C, 10M, and 10Y in this order.

In each process unit 10, a toner image of each color is formed. That is, the photosensitive drum 11 rotates, and the charging rollers 12, the developing rollers 14, and the supply rollers 15 rotate along with the rotation of the photosensitive drum 11. The charging roller 12 uniformly charges the surface of the photosensitive drum 11. The exposure head 13 exposes the surface of the photosensitive drum 11 with light based on image data for each color to form the electrostatic latent image.

The electrostatic latent image formed on the surface of the photosensitive drum 11 is developed with the toner adhering to the developing roller 14 to form a toner image on the surface of the photosensitive drum 11. The toner image on the photosensitive drum 11 is transferred to the medium P on the transfer belt 22 by the transfer voltage applied to the transfer roller 21.

The toner images of the respective colors formed by the process units 10K, 10C, 10M, and 10Y are sequentially transferred to the medium P and superimposed on each other. The medium P on which the toner images of the respective colors have been transferred is further conveyed by the transfer belt 22 and introduced into the fixing unit 40 via the inlet opening 45.

In the fixing unit 40, heat and pressure are applied to the medium P by the fixing belt 41 heated by the heater 43 and also by the pressure roller 42, respectively, whereby the toner images are fixed on the medium P.

The medium P with the toner images of respective colors fixed thereon is conveyed along the ejection conveyance path R2 by the ejection rollers 121 and 122 of the medium ejection section 120, and is ejected to the outside of the image forming apparatus 1. The ejected media P is placed on the stacker portion 123. With this, the image forming operation on the medium P is completed.

In the case of double-sided printing, the ejection rollers 121 and 122 convey the medium P by a predetermined amount and reverse the medium P when a rear end of the medium P passes through the switching guide 125. Furthermore, the switching guide 125 operates to feed the medium P to the re-conveyance section 130. In the return conveyance path R3, the medium P is conveyed by the conveyance rollers 131 to 133 and further passes through between the registration roller 115 and the pinch roller 134 to reach the conveyance path R1. Thereafter, the medium P is conveyed by the conveyance roller pair 119 to the transfer unit 20, where the toner image is formed on the back surface of the medium P.

When the above image forming operation is performed, the first operation lever 54 (FIG. 4) is located at the locking position to lock the top cover unit 50 in the housing 70. The second operation lever 55 is located at the connecting position to connect the top cover unit 50 to the basket unit 60.

On the other hand, when a jammed medium P is to be detached from the image forming apparatus 1 or when the transfer unit 20 is to be replaced, the top cover unit 50 and the basket unit 60 are opened in a state where the top cover unit 50 and the basket unit 60 are connected together as illustrated in FIG. 4.

The user first opens the front cover 90 and pulls out the first operation lever 54 to unlock the top cover unit 50. Then, the user rotates the top cover unit 50 to the open position without pulling out the second operation lever 55. This allows the top cover unit 50 and the basket unit 60 to be rotated to the open position in a state where the top cover unit 50 and the basket unit 60 are connected together, as illustrated in FIGS. 4 and 5, thus enabling the replacement of the transfer unit 20.

If the second operation lever 55 is pulled out before the top cover unit 50 is rotated to the open position, the connection between the top cover unit 50 and the basket unit 60 is released, thus enabling the replacement of the process units 10K, 10C, 10M, and 10Y. A description of this will be omitted.

<Attachment Operation of Transfer Unit 20>

Figure 14A:
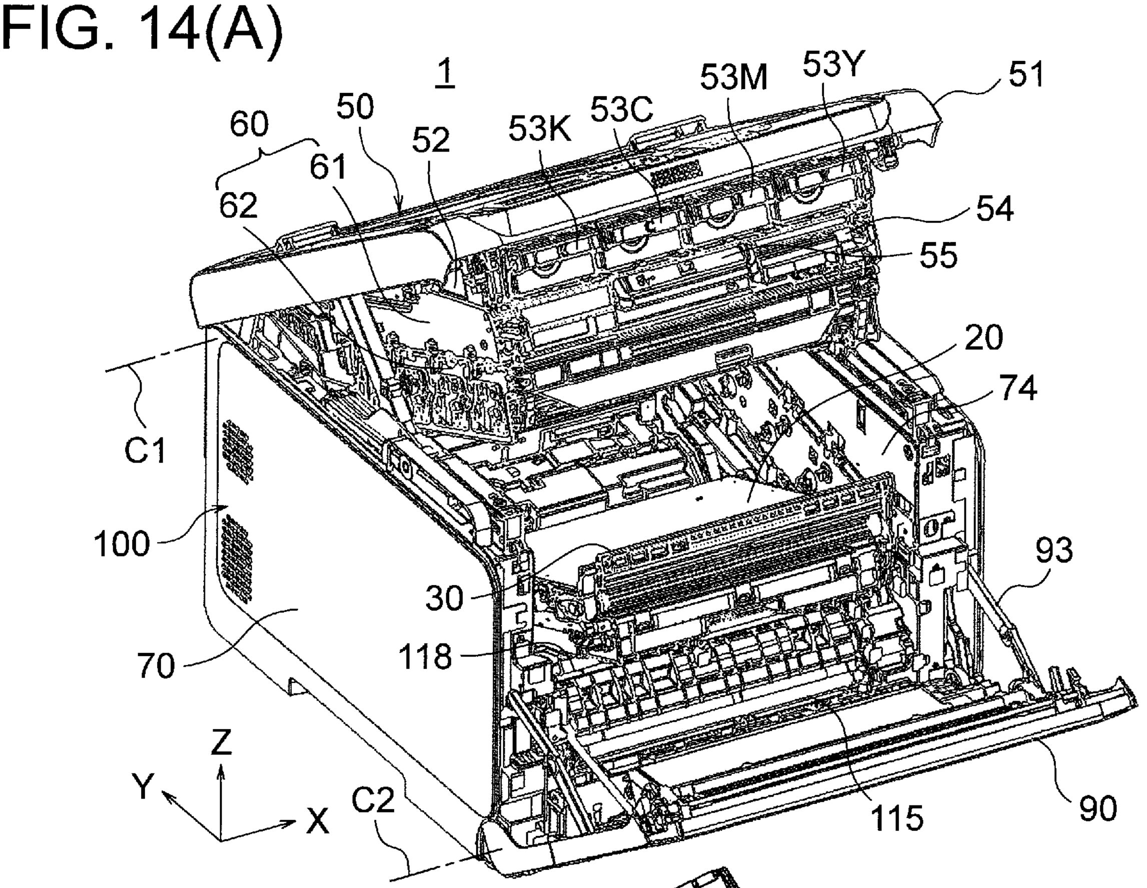
FIGS. 14(A) and 14(B) are a perspective view and a side cross-sectional view illustrating an attachment operation of the transfer unit of the embodiment to the housing, respectively.
Figure 14B:
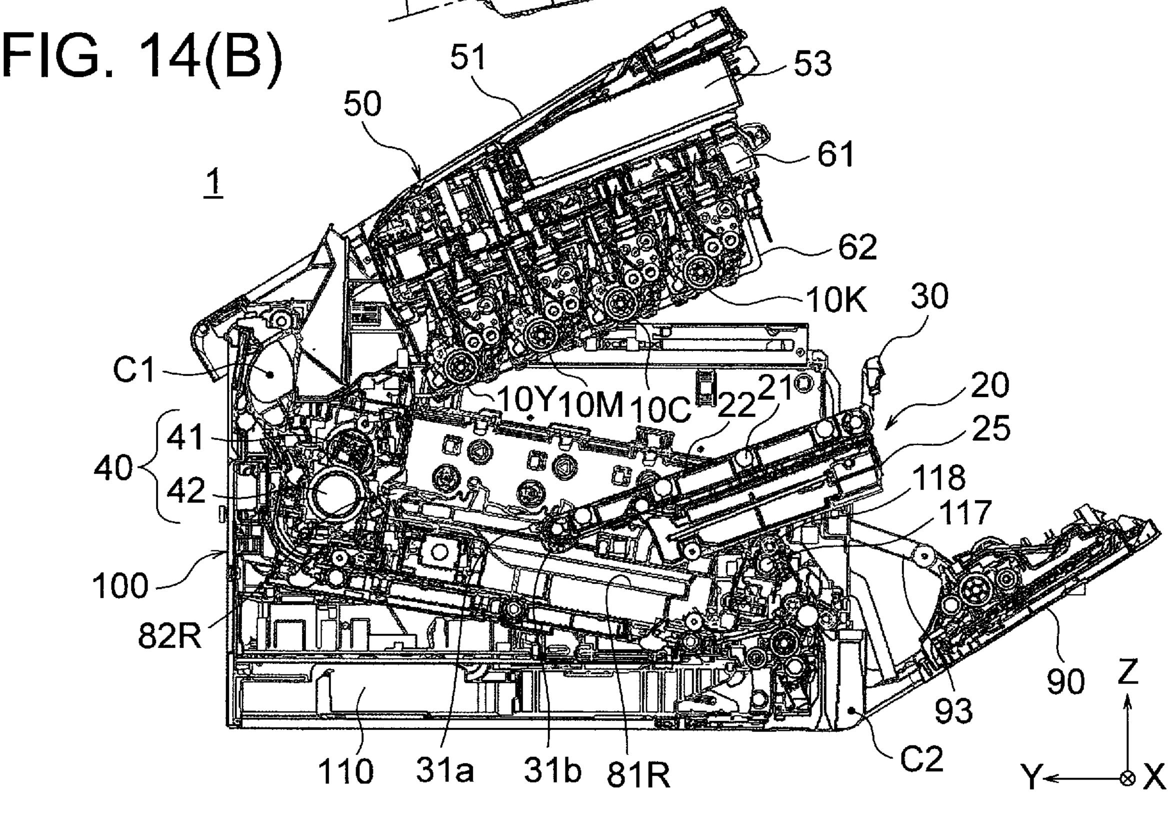

Next, an operation of attaching the transfer unit 20 in the housing 70 of the image forming apparatus 1 will be described. FIGS. 14(A) and 14(B) are a perspective view and a side view illustrating an attachment operation of the transfer unit 20 in the housing 70 of the image forming apparatus 1, respectively.

As illustrated in FIG. 14(A), the user grasps the gripping portion 30 of the transfer unit 20 and inserts the transfer unit 20 into the housing 70. At this time, as illustrated in FIG. 14(B), the user inserts the transfer unit 20 into the housing 70 while the guide portions 31*b* of the bearing portions 31L and 31R slide along the guide rails 81L and 81R of the housing 70, respectively.

Figure 15A:
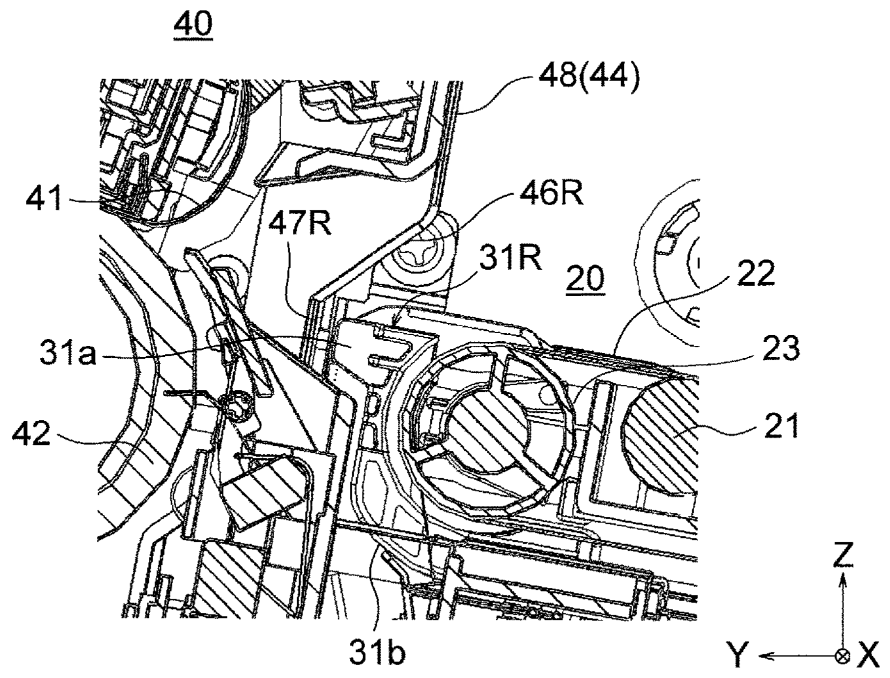
FIGS. 15(A) and 15(B) are side cross-sectional views illustrating a bearing portion and its surroundings when the transfer unit of the embodiment is attached in a regular attachment position.
Figure 15B:
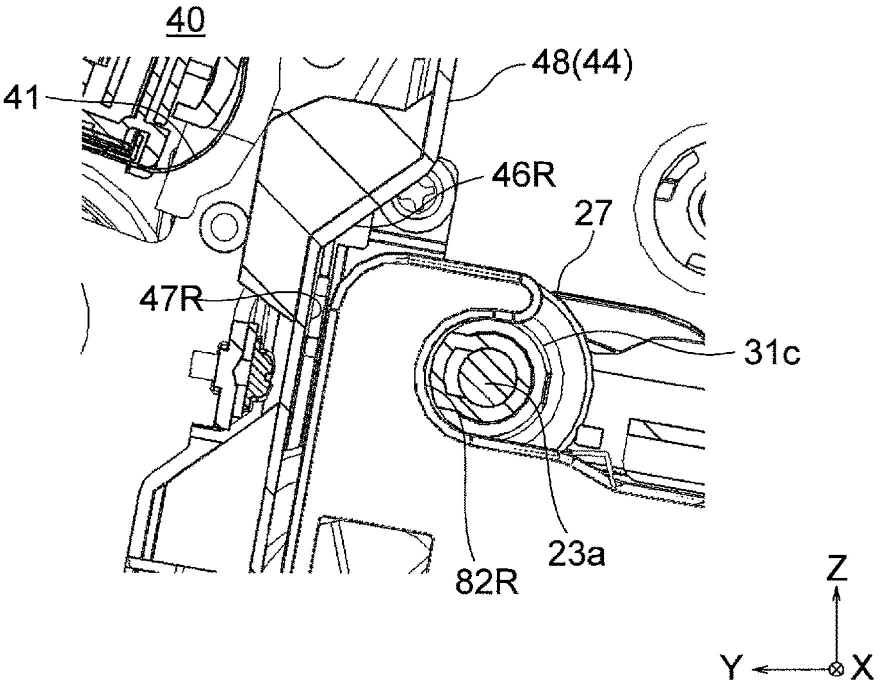

FIGS. 15(A) and 15(B) are cross-sectional views at different positions illustrating the bearing portion 31R and its surroundings when the transfer unit 20 is attached in the attachment position. While FIGS. 15(A) and 15(B) illustrate the bearing portion 31R, the action of the bearing portion 31L is the same as that of the bearing portion 31R.

As illustrated in FIG. 15(B), when the transfer unit 20 is attached in the attachment position, the fitting portions 31*c* of the bearing portions 31L and 31R fit into the positioning grooves 82L and 82R of the housing 70 substantially in the +Y direction (second direction), respectively.

At this time, as illustrated in FIG. 15(A), the protrusions 31*a* of the bearing portions 31L and 31R face the retracted surfaces 47L and 47R of the unit housing 44 of the fixing unit 40, respectively. In this state, the protrusions 31*a* do not contact any of the wall portion 48, the inclined surfaces 46L and 46R, and the retracted surfaces 47L and 47R of the unit housing 44 of the fixing unit 40.

In a state where the transfer unit 20 is attached in the attachment position, the waste toner box 25 (FIG. 14(B)) of the transfer unit 20 is placed on the guide rails 81L and 81R of the housing 70. The U-shaped grooves 28L and 28R (FIG. 7(A), FIG. 8(A)) of the transfer unit 20 are engaged with the posts 84L and 84R (FIG. 11(B), FIG. 12(B)) of the housing 70, respectively, to position the transfer unit 20 in the X, Y and Z directions. The position of the transfer unit 20 at this time is defined as the attachment position (or regular attachment position).

After the transfer unit 20 is attached in the attachment position, when the user rotates the top cover unit 50 to the closed position, the top cover unit 50 and the basket unit 60 rotate together to the closed position. When the top cover unit 50 and the basket unit 60 reach the closed position together, the process units 10K, 10C, 10M, and 10Y of the basket unit 60 contact the surface of the transfer belt 22 of the transfer unit 20.

In this state, when the user rotates the top cover unit 50 to the closed position, the locking portion 58 illustrated in FIG. 4 engages the hole 78, whereby the top cover unit 50 is locked to the housing 70. Furthermore, when the user rotates the front cover 90 to the closed position and locks the front cover 90, the image forming apparatus 1 is brought into a state where the image forming apparatus 1 is capable of start printing.

<Incorrect Attachment of the Transfer Unit 20 (when the Fixing Unit 40 is Attached)>

Next, the incorrect attachment of the transfer unit 20 to the housing 70 of the image forming apparatus 1 will be described. First, a description will be given on a case in which the transfer unit 20 is incorrectly attached to the housing 70 of the image forming apparatus 1 in a state where the fixing unit 40 is attached to the housing 70.

Figure 16:
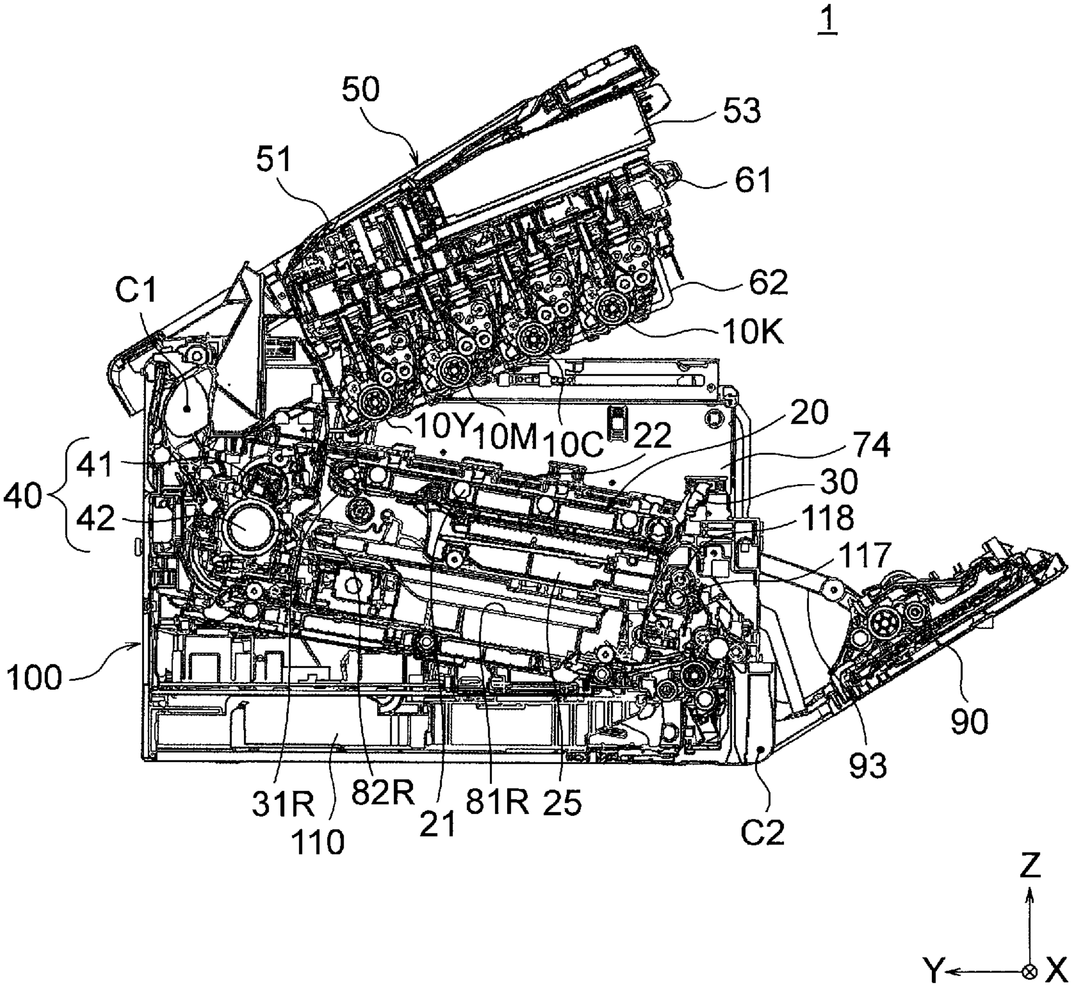
FIG. 16 is a side cross-sectional view illustrating a state in which the transfer unit is incorrectly attached to the housing with the fixing unit attached thereto in the image forming apparatus of the embodiment.

FIG. 16 is a side cross-sectional view illustrating a state in which the transfer unit 20 is incorrectly attached to the housing 70 of the image forming apparatus 1. As illustrated in FIG. 16, the user may insert the transfer unit 20 into the housing 70 while lifting the transfer unit 20 without causing the transfer unit 20 to slide along the guide rails 81L and 81R.

Figure 17A:
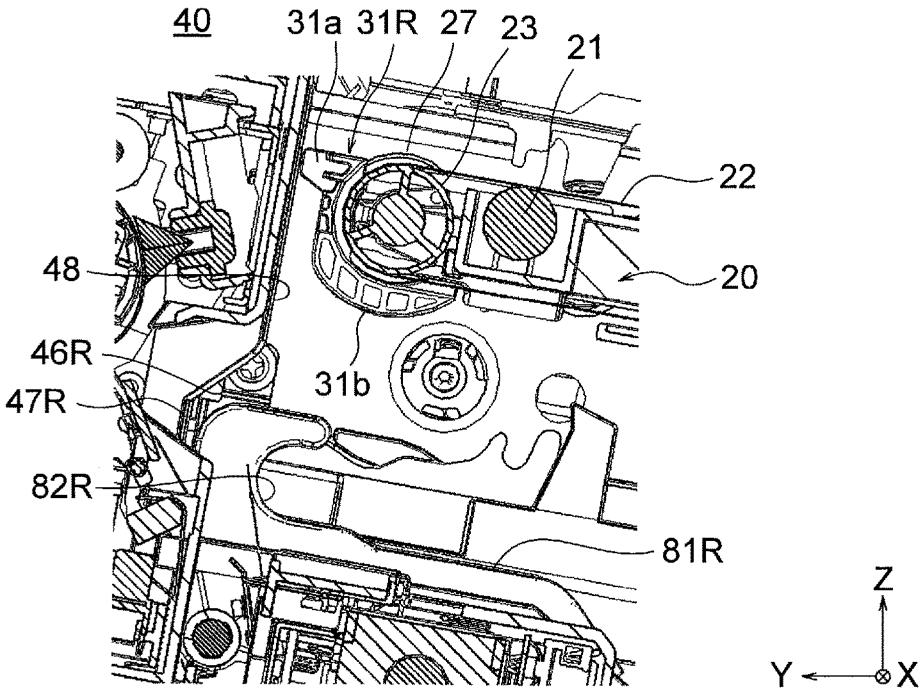
FIGS. 17(A) and 17(B) are enlarged views of parts of the transfer unit illustrated in FIG. 16.
Figure 17B:
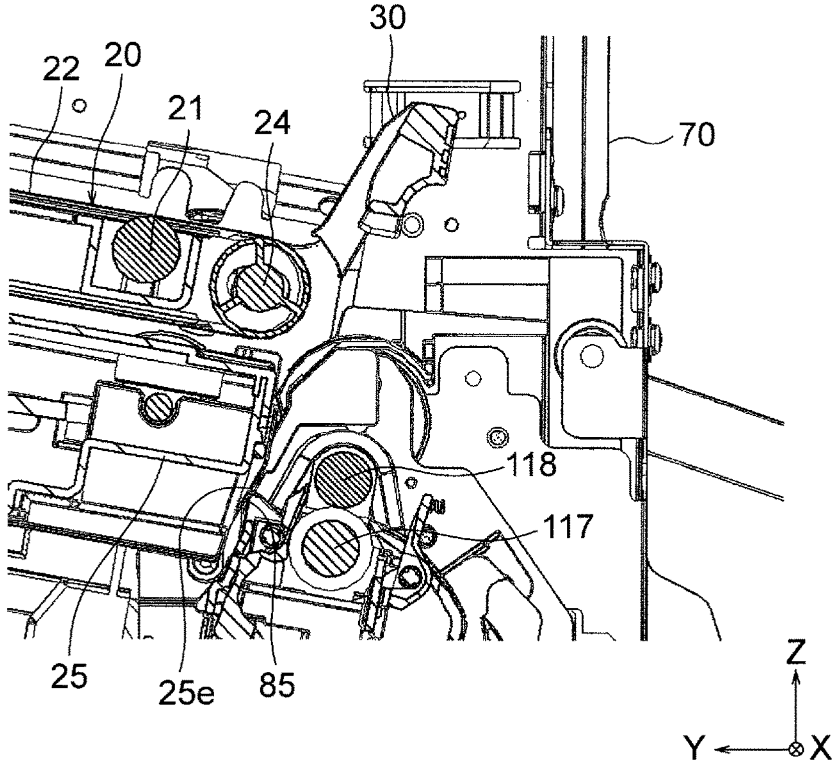

FIG. 17(A) is a cross-sectional view illustrating the bearing portion 31R and its surroundings in the transfer unit 20 incorrectly attached. FIG. 17(B) is a cross-sectional view illustrating the waste toner box 25 and its surroundings in the transfer unit 20 incorrectly attached. While FIG. 17(A) illustrates the bearing portion 31R, the action of the bearing portion 31L is the same as that of the bearing portion 31R.

When the transfer unit 20 is inserted while being lifted, each of the protrusions 31*a* of the bearing portions 31L and 31R of the transfer unit 20 contacts the wall portion 48 of the unit housing 44 of the fixing unit 40. The movement of the transfer unit 20 substantially in the +Y direction (second direction) is restricted by the contact between the wall portion 48 and each protrusion 31*a* of the bearing portions 31L and 31R.

Thus, as illustrated in FIG. 17(B), the ribs 25*e* of the waste toner box 25 of the transfer unit 20 contact the roller frame 85 provided in the housing 70. Thus, the transfer unit 20 cannot be descended to the position where the transfer unit 20 contacts the guide rails 81L and 81R.

When the user intends to rotate the top cover unit 50 to the closed position in this state, the process units 10K, 10C, 10M, and 10Y of the basket unit 60 connected to the top cover unit 50 contact the transfer belt 22. Thus, the top cover unit 50 cannot be rotated to the closed position.

That is, as a result of the restriction of the movement of the transfer unit 20 in the +Y direction, the closing of the top cover unit 50 is also restricted. The user can recognize that the transfer unit 20 has been attached incorrectly since the top cover unit 50 cannot be closed.

As illustrated in FIGS. 17(A) and 17(B), the position of the transfer unit 20 when the protrusions 31*a* of the bearing portions 31L and 31R contact the wall portion 48 of the fixing unit 40 and the waste toner box 25 contacts the roller frame 85 is referred to as a second irregular position.

<Incorrect Attachment of the Transfer Unit 20 (in a State where the Fixing Unit 40 is not Attached)>

Next, a description will be given on a case in which the transfer unit 20 is incorrectly attached to the housing 70 of the image forming apparatus 1 in a state where the fixing unit 40 is not attached to the housing 70.

Figure 18:
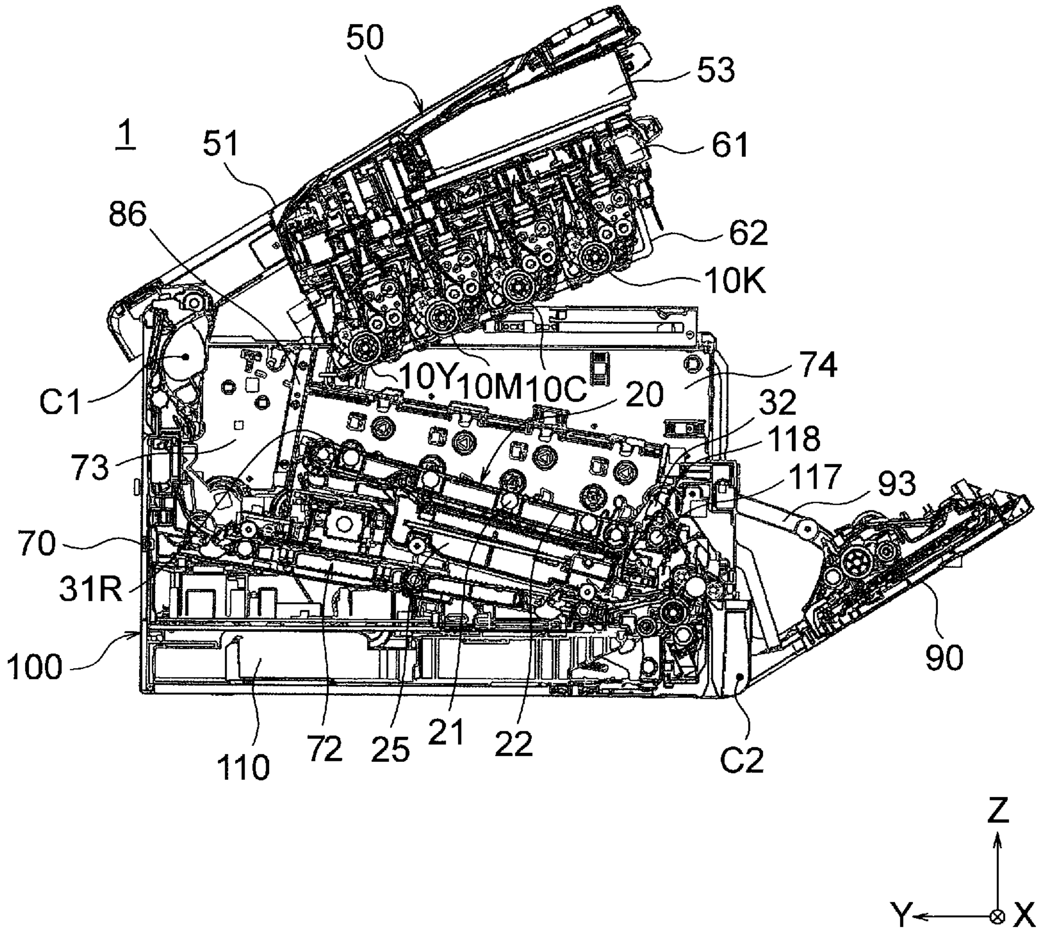
FIG. 18 is a side cross-sectional view illustrating a state in which the transfer unit is incorrectly attached to the housing to which the fixing unit is not attached in the image forming apparatus of the embodiment.

FIG. 18 is a side cross-sectional view illustrating a state in which the transfer unit 20 is incorrectly attached to the housing 70 of the image forming apparatus 1 in the state where the fixing unit 40 is not attached to the housing 70. As illustrated in FIG. 18, the housing 70 of the image forming apparatus 1 has an accommodation area 73 in which the fixing unit 40 is accommodated and which is adjacent in the +Y direction to the accommodation area 72 of the transfer unit 20. The fixing unit 40 is attached in the accommodation area 73 substantially in the −Z direction (first direction) along a guide rail 86 provided in the housing 70.

Figure 19A:
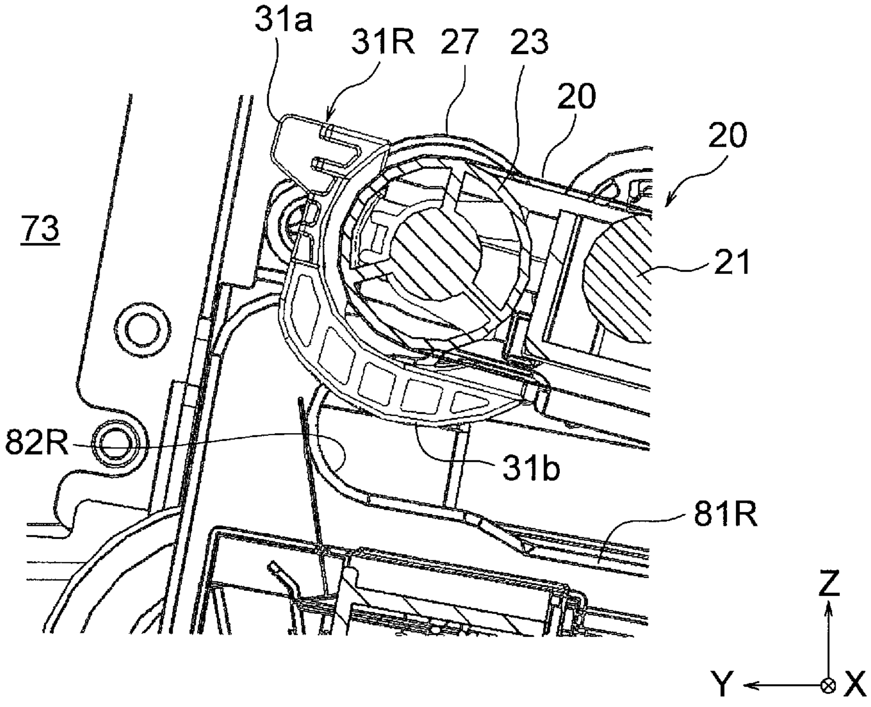
FIGS. 19(A) and 19(B) are diagrams illustrating a bearing portion of the transfer unit illustrated in FIG. 18.
Figure 19B:
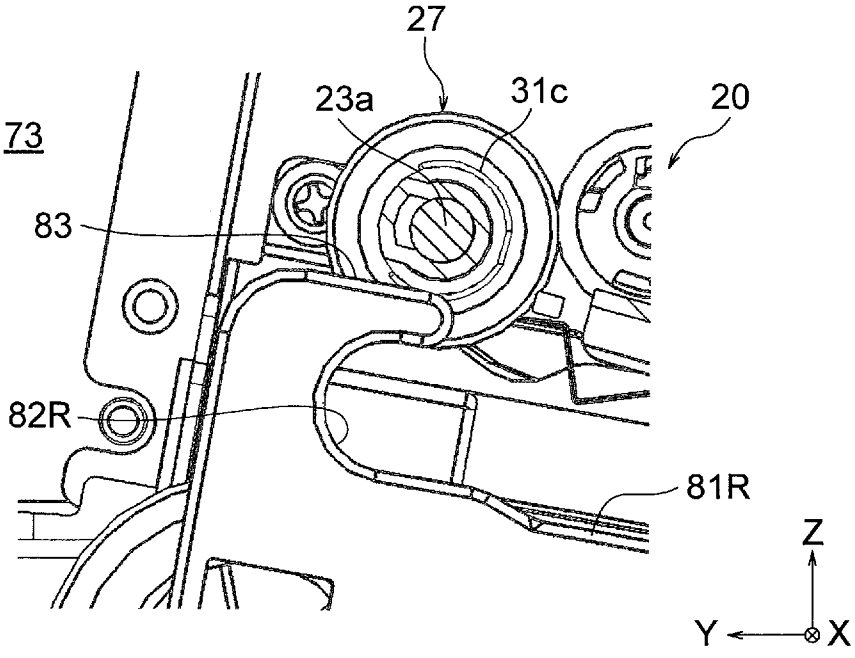

FIGS. 19(A) and 19(B) are cross-sectional views at different cross-sections illustrating the bearing portion 31R and its surroundings of the transfer unit 20 incorrectly attached in the state where the fixing unit 40 is not attached to the housing 70. While FIGS. 19(A) and 19(B) illustrate the bearing portion 31R, the action of the bearing portion 31L is the same as that of the bearing portion 31R.

As illustrated in FIG. 19(A), when the user inserts the transfer unit 20 into the housing 70 while lifting the transfer unit 20 without causing the transfer unit 20 to slide along the guide rails 81L and 81R, there is nothing that contacts the protrusions 31*a* of the bearing portions 31L and 31R because the fixing unit 40 is not attached. That is, the movement of the transfer unit 20 substantially in the +Y direction cannot be restricted.

Thus, as illustrated in FIG. 19(B), the fitting portions 31*c* of the bearing portions 31L and 31R ride onto shelves 83 of the positioning grooves 82L and 82R in the +Z direction.

In this case, the waste toner box 25 of the transfer unit 20 does not contact the roller frame 85 (FIG. 17(B)). As a result, the transfer unit 20 is brought into a state where the bearing portions 31L and 31R ride onto the shelf 83 and the waste toner box 25 is placed on the guide rails 81L and 81R. The position of the transfer unit 20 at this time is referred to as a first irregular position.

Figure 20A:
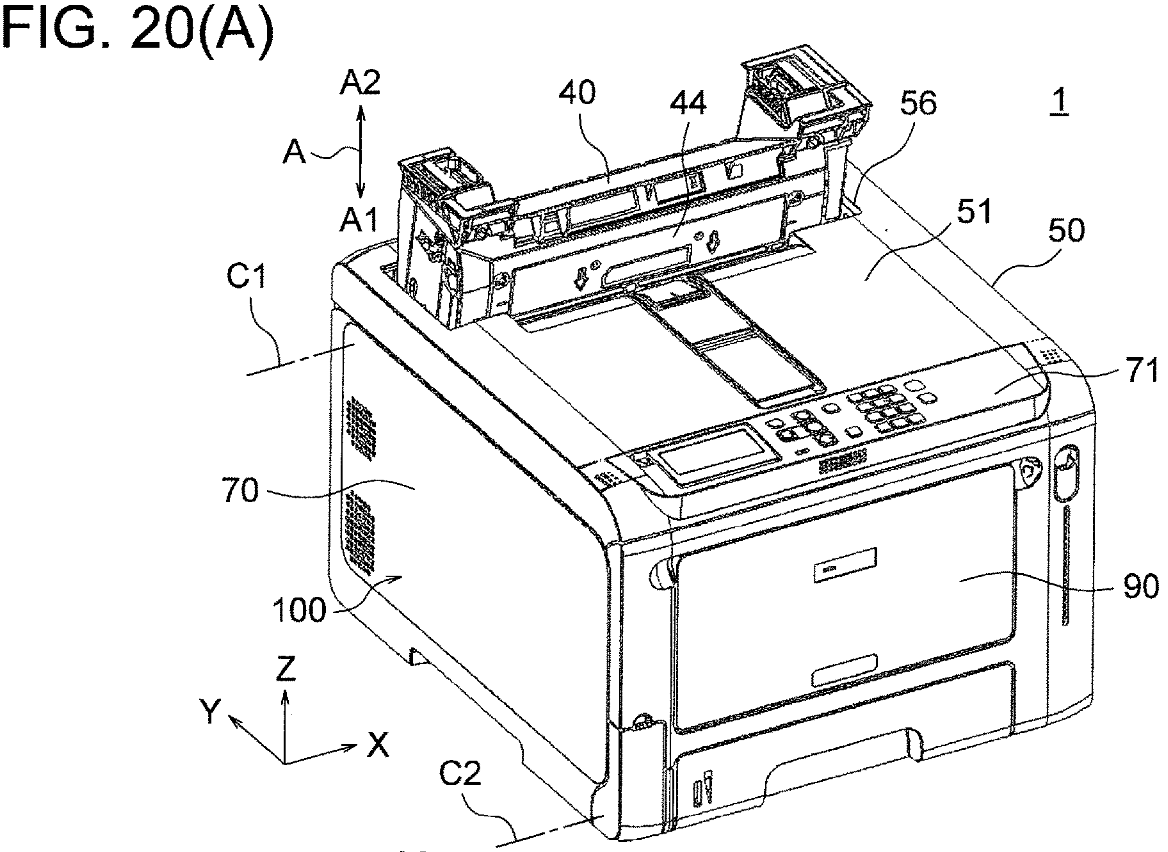
FIGS. 20(A) and 20(B) are a perspective view and a side cross-sectional view illustrating an attachment operation of the fixing unit to the housing in the image forming apparatus of the embodiment, respectively.
Figure 20B:
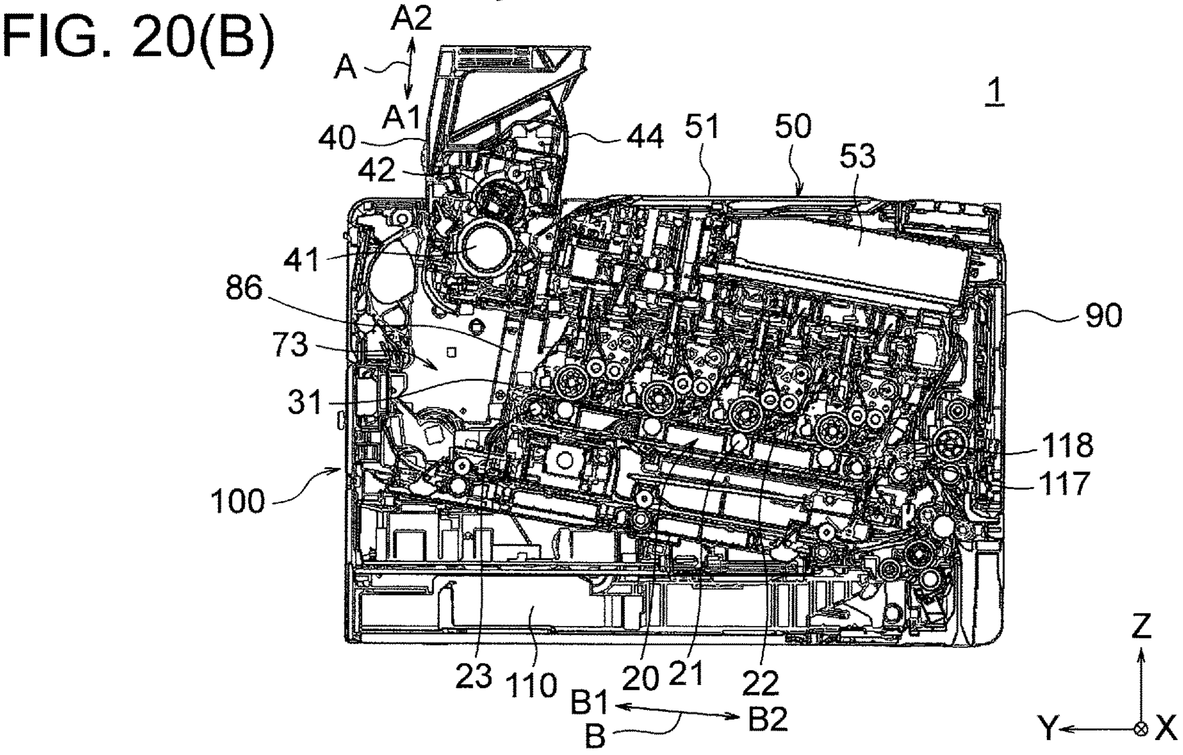

FIGS. 20(A) and 20(B) are a perspective view and a side cross-sectional view illustrating an attachment operation of the fixing unit 40 in the housing 70 of the image forming apparatus 1, respectively. As illustrated in FIGS. 20(A) and 20(B), the fixing unit 40 is attached in the accommodation area 73 within the housing 70 in the first direction (substantially in the −Z direction) via an opening 56 formed in the top cover unit 50.

Figure 21A:
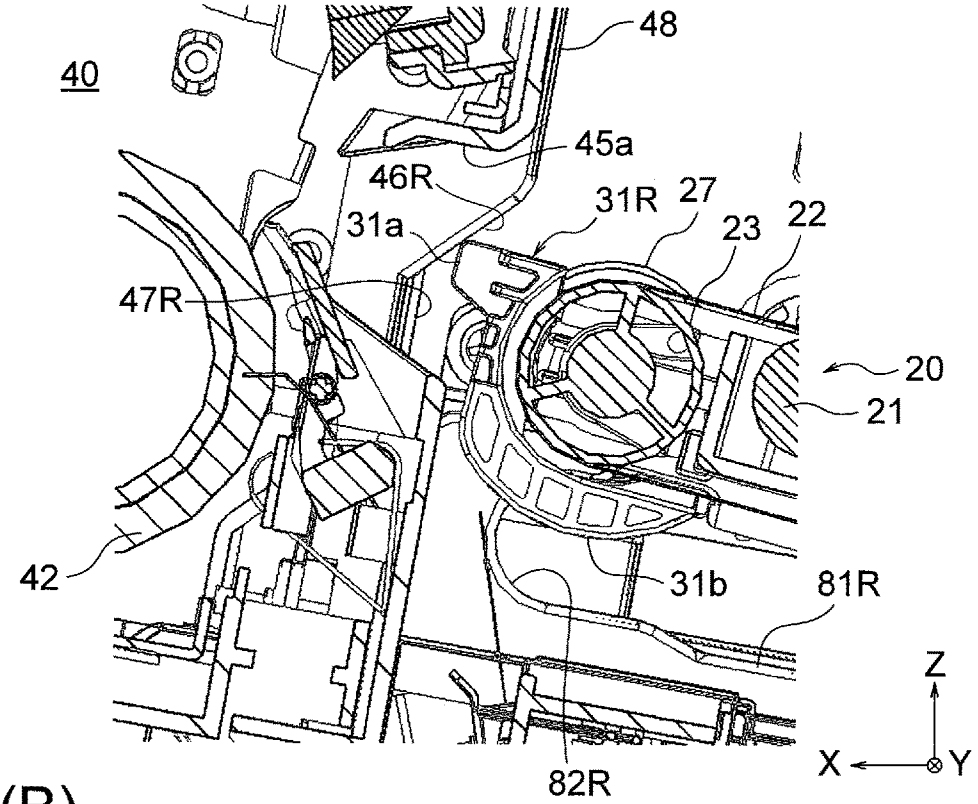
FIGS. 21(A) and 21(B) are side cross-sectional views illustrating the action of restricting the attachment of the fixing unit to the housing in the image forming apparatus of the embodiment.
Figure 21B:
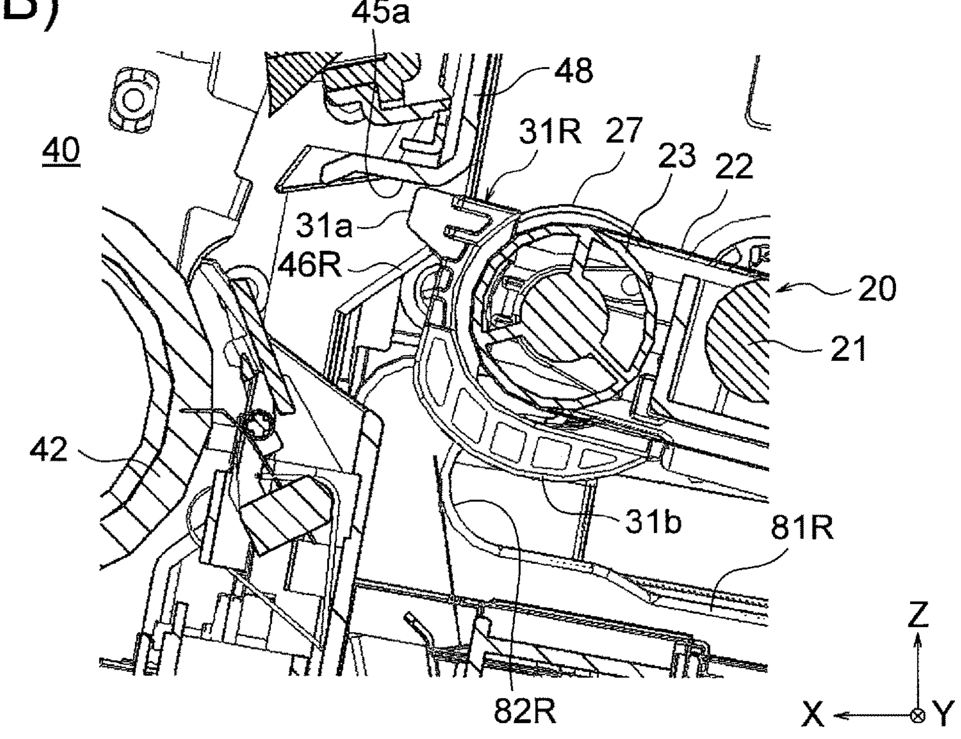

FIGS. 21(A) and 21(B) are cross-sectional views illustrating the attachment operation of the fixing unit 40 in a state in which the transfer unit 20 is incorrectly attached to the housing 70 of the image forming apparatus 1. While FIGS. 21(A) and 21(B) illustrate the bearing portion 31R, the action of the bearing portion 31L is also the same as that of the bearing portion 31R.

As illustrated in FIG. 21(A), when the fixing unit 40 is inserted into the housing 70 substantially in the −Z direction, the inclined surfaces 46L and 46R of the unit housing 44 contact the protrusions 31*a* of the bearing portions 31L and 31R of the transfer unit 20, respectively. Thus, the user perceives a light impact due to the contact between the inclined surfaces 46L and 46 and the protrusions 31*a* of the bearing portions 31L and 31R.

When the fixing unit 40 is further inserted into the housing 70 substantially in the −Z direction, the protrusions 31*a* of the bearing portions 31L and 31R are elastically deformed in the X direction. Thus, as illustrated in FIG. 21(B), the protrusions 31*a* of the bearing portions 31L and 31R enter the interior of the inlet opening 45 through the inclined surfaces 46L and 46R, respectively.

When the fixing unit 40 is further inserted into the housing 70 substantially in the −Z direction, the protrusions 31*a* of the bearing portions 31L and 31R contact the upper end (i.e., restriction surface 45*a*) of the inlet opening 45. The movement of the fixing unit 40 substantially in the −Z direction is restricted by the contact between the protrusion 31*a* and the restriction surface 45*a*.

Thus, the user can recognize that the transfer unit 20 has been attached incorrectly since the fixing unit 40 can be inserted only halfway.

Figure 22:
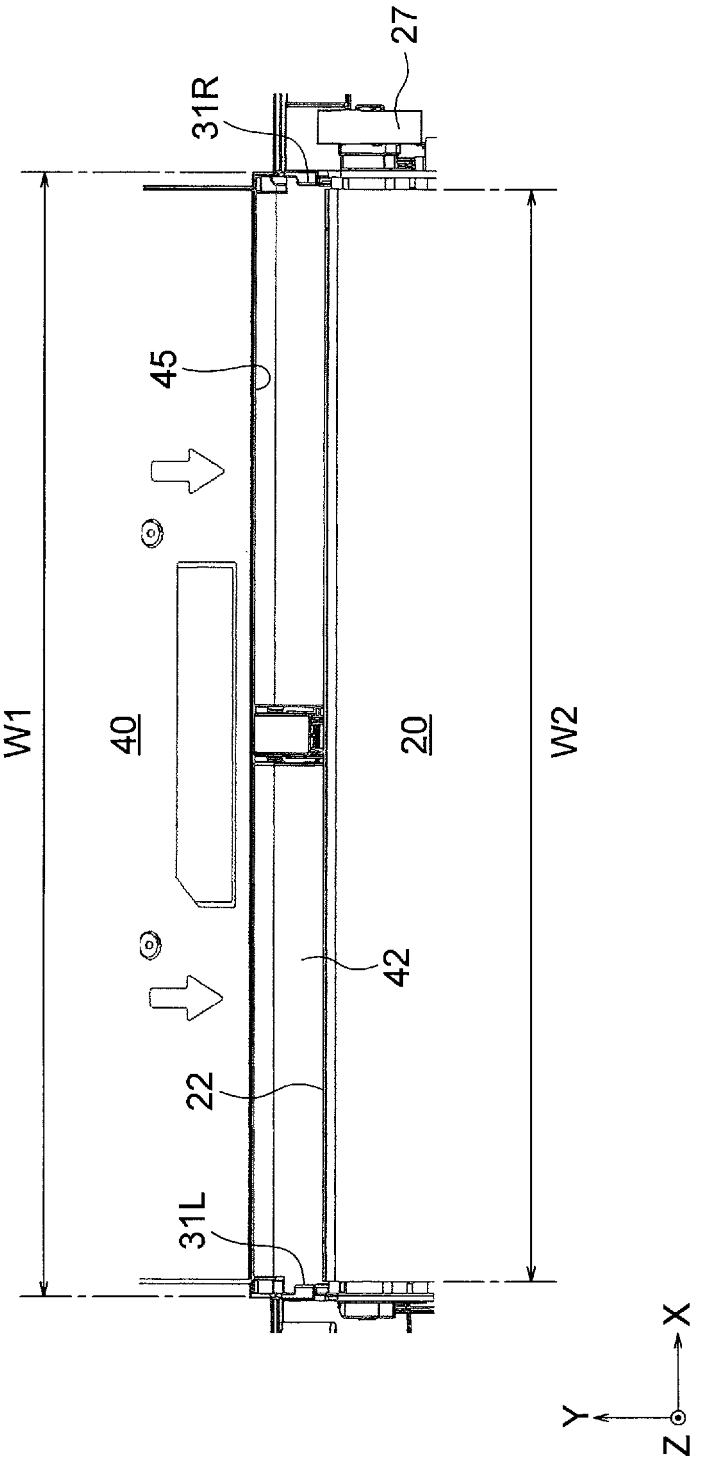
FIG. 22 is a diagram illustrating an inlet opening of the fixing unit and the transfer unit in the embodiment.
Figures 23A, 23B:
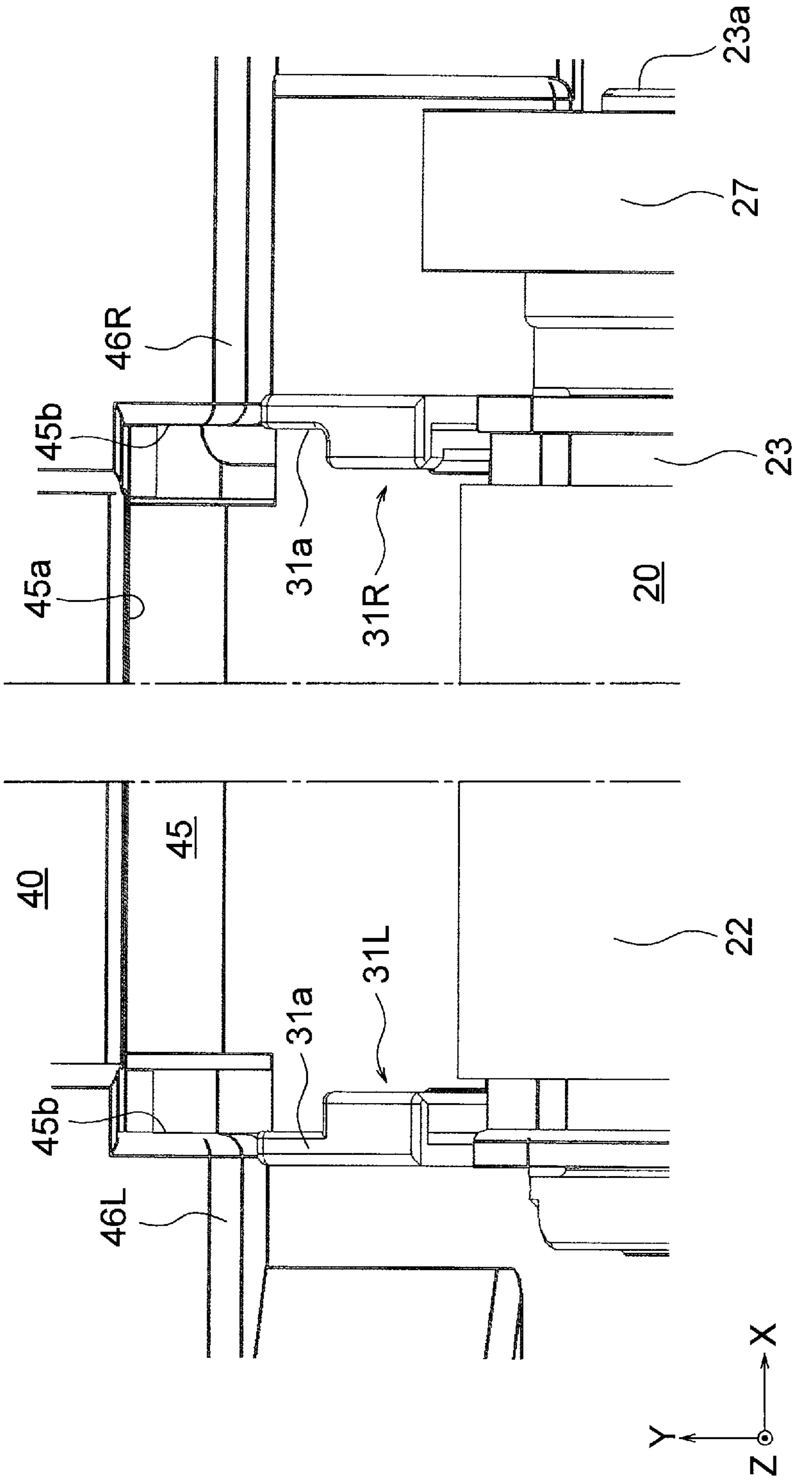
FIGS. 23(A) and 23(B) are enlarged diagrams of the inlet opening of the fixing unit and the transfer unit in the embodiment.

FIG. 22 is a diagram of the inlet opening 45 of the fixing unit 40 and a part of the transfer unit 20 facing the inlet opening 45 as viewed in a direction indicated by arrow E in FIG. 13. FIG. 23(A) is a diagram illustrating an end region of the inlet opening 45 in the −X direction and a part of the transfer unit 20 facing this end region. FIG. 23(B) is a diagram illustrating an end region of the inlet opening 45 in the +X direction and a part of the transfer unit 20 facing this end region.

As illustrated in FIG. 22, a width W1 of the inlet opening 45 of the fixing unit 40 in the X direction is wider than a width W2 of the transfer belt 22 in the X direction. The inclined surfaces 46L and 46R are formed on both sides of the inlet opening 45 in the X direction in the unit housing 44.

As illustrated in FIG. 23(A), the protrusion 31*a* of the bearing portion 31L of the transfer unit 20 is disposed to straddle a boundary portion between the inlet opening 45 and the inclined surface 46L. As illustrated in FIG. 23(B), the protrusion 31*a* of the bearing portion 31R of the transfer unit 20 is disposed to straddle a boundary portion between the inlet opening 45 and the inclined surface 46R.

Thus, when the protrusions 31*a* of the bearing portions 31L and 31R contact the inclined surfaces 46L and 46R of the unit housing 44, respectively, the protrusions 31*a* elastically deform in the X direction to enter the inlet opening 45, and can be brought into a state of contacting the restriction surface 45*a*.

That is, when the user inserts the fixing unit 40 in the state where the transfer unit 20 is incorrectly attached, the incorrect attachment of the transfer unit 20 can be recognized by the light impact caused by the contact between the protrusions 31*a* of the bearing portions 31L and 31R and the unit housing 44, and also by the restriction of the attachment of the fixing unit 40 due to the contact between the protrusions 31*a* and the restriction surface 45*a*.

In particular, as illustrated in FIGS. 21(A), the inclined surfaces 46L and 46R of the unit housing 44 are inclined toward the restriction surface 45*a* (i.e., inclined so as to guide the protrusion 31*a* toward the restriction surface 45*a*). Thus, the impact from the contact between the protrusions 31*a* and the inclined surfaces 46L and 46R can be mitigated, and the protrusion 31*a* can be smoothly brough into a state of contacting the restriction surface 45*a*.

The contact between the protrusion 31*a* and the restriction surface 45*a* does not allow the fixing unit 40 to be accommodated in the accommodation area 73 and causes the fixing unit 40 to protrude upward from the image forming apparatus 1, thereby enabling the user to easily recognize the incorrect attachment.

Thus, the user can recognize that the transfer unit 20 has been attached incorrectly without causing any damage to components such as the bearing portions 31L and 31R.

<Effects of Embodiment>

As described above, the image forming apparatus 1 of the present embodiment includes the apparatus body 100, the fixing unit 40 attachable to the apparatus body 100 in the first direction (substantially in the −Z direction), and the transfer unit (belt unit) 20 attachable in the attachment position within the apparatus body 100 in the second direction (substantially in the +Y direction) intersecting the first direction. The transfer unit 20 has the protrusion (restricting portion) 31*a* that restricts the attachment of the fixing unit 40 when the transfer unit 20 is positioned in the first irregular position.

Thus, the user can recognize that the transfer unit 20 has been positioned in the first irregular position (i.e., attached incorrectly) by the restriction of the attachment of the fixing unit 40. That is, with a simple configuration, it becomes possible to enable the user to recognize incorrect attachment of the transfer unit 20.

The image forming apparatus 1 further includes the top cover unit (cover member) 50 that is openable and closable with respect to the apparatus body 100. When the transfer unit 20 is positioned in the second irregular position in the state where the fixing unit 40 is attached to the apparatus body 100, the closing of the top cover unit 50 is restricted by contact between the protrusions 31*a* and the fixing unit 40. Thus, the user can recognize that the transfer unit 20 has been incorrectly attached by not being able to close the top cover unit 50.

The unit housing 44 of the fixing unit 40 has the inclined surfaces 46L and 46R (first contact portions) that contact the protrusions 31*a* when the attachment of the fixing unit 40 is restricted by the protrusions 31*a*, and the restriction surface 45*a* (second contact portion) disposed on the side in the detachment direction (A2 direction) of the fixing unit 40 with respect to the inclined surfaces 46L and 46R. The protrusions 31*a* are elastically deformed by contacting the inclined surfaces 46L and 46R, and further contact the restriction surface 45*a*, thereby restricting the attachment of the fixing unit 40. This enables the user to recognize incorrect attachment of the transfer unit 20 without causing damage to the protrusions 31*a* or the like.

Since the inclined surfaces 46L and 46R (first contact portions) are inclined toward the restriction surface 45*a* (second contact portion) (see FIG. 21(B)), the protrusions

31*a* can be brought into a state of contacting the restriction surface 45*a* while mitigating the impact caused by the contact between the protrusions 31*a* and the inclined surfaces 46L and 46R. This can enhance the effect of preventing damage to the protrusion 31*a* and the like.

The bearing portions 31L and 31R of the transfer unit 20 have the fitting portions 31*c* (second engagement portions) that can engage the positioning grooves 82L and 82R (first engagement portions) of the apparatus body 100 in the attachment direction (second direction) of the transfer unit 20. The first irregular position of the transfer unit 20 described above is the position where the transfer unit 20 rides onto the positioning grooves 82L and 82R in the direction different from the attachment direction of the transfer unit 20 (for example, substantially in the +Z direction). The incorrect attachment of the transfer unit 20 is usually difficult for the user to recognize, but the present embodiment enables the user to recognize the incorrect attachment.

The transfer unit 20 has the guide portions 31*b* that are guided by the guide rails 81L and 81R (guide members) of the apparatus body 100, and the above protrusion 31*a* is integrally formed with the guide portion 31*b*. Therefore, with a simple configuration, it becomes possible to enable the user to recognize the incorrect attachment of the transfer unit 20.

The protrusions 31*a* are provided to protrude from the transfer unit 20 in the attachment direction (substantially in the +Y direction: in the second direction). The protrusions 31*a* restrict the attachment of the fixing unit 40 when the transfer unit 20 is located in the first irregular position, and restrict the closing of the top cover unit 50 (cover member) 50 by contacting the fixing unit 40 when the transfer unit 20 is located in the second irregular position. Thus, these functions can be implemented with a simple configuration.

In the above embodiment, the protrusions 31*a* of the bearing portions 31L and 31R constitute the restricting portions that restrict the attachment of the fixing unit 40 and also restrict the closing of the top cover unit 50. However, the restricting portion is not limited to the protrusion 31*a* in each of the bearing portions 31L and 31R, but may be any part of the transfer unit 20. For example, the protrusion(s) may be formed on the belt frame 26 of the transfer unit 20.

In the above embodiment, the restricting portions of the transfer unit 20 (the protrusions 31*a* of the bearing portions 31L and 31R) have the actions to restrict the attachment of the fixing unit 40 and restrict the closing of the top cover unit 50 by contacting the fixing unit 40, but the restricting portion may have only one of these actions.

In the above embodiment, the bearing portions 31L and 31R have the guide portions 31*b*, but they are not limited to this example. The transfer unit 20 only needs to have a guide portion that is guided by a guide member in the apparatus body 100.

The image forming apparatus 1 may have another attachable and detachable belt unit instead of the transfer unit 20, and may also have another openable and closable cover member instead of the top cover unit 50.

Although the embodiment has been described above, but the present disclosure is not limited to the above-described embodiment, and various modifications or changes can be made thereto.

The present disclosure can be used for image forming apparatuses (for example, copiers, facsimiles, printers, or multifunction machines) that form images on media using the electrophotographic method.

Various aspects of the present disclosure are collectively described below as appendixes.

(Appendix 1) An image forming apparatus comprising:
- an apparatus body;
- a fixing unit attachable to the apparatus body in a first direction; and
- a belt unit attachable in an attachment position within the apparatus body in a second direction intersecting the first direction,
- wherein the belt unit has a restricting portion that restricts attachment of the fixing unit when the belt unit is positioned in a first irregular position different from the attachment position.

(Appendix 2)

The image forming apparatus according to appendix 1, further comprising a cover member provided to be openable and closable with respect to the apparatus body,
- wherein closing of the cover member is restricted by contact of the restricting portion with the fixing unit when the belt unit is positioned at a second irregular position different from the attachment position in a state where the fixing unit is attached to the apparatus body.

(Appendix 3)

The image forming apparatus according to appendix 2, wherein, when the cover member moves in a closing direction, the belt unit contacts the cover member and is positioned at a position where the closing of the cover member is restricted by contact between the restricting portion and the fixing unit.

(Appendix 4)

The image forming apparatus according to any one of appendixes 1 to 3, wherein a unit housing of the fixing unit includes:
- a first contact portion that contacts the restricting portion when the attachment of the fixing unit to the apparatus body is restricted by the restricting portion; and
- a second contact portion disposed in a detachment direction of the fixing unit with respect to the first contact portion,
- wherein the restricting portion is elastically deformed by contacting the first contact portion and further contacts the second contact portion, thereby restricting the attachment of the fixing unit to the apparatus body.

(Appendix 5)

The image forming apparatus according to appendix 4, wherein the first contact portion has an inclined surface inclined toward the second contact portion.

(Appendix 6)

The image forming apparatus according to any one of claims 1 to 5, wherein the belt unit has a second engagement portion capable of engaging a first engagement portion in the second direction, the first engagement portion being provided in the apparatus body, and
- wherein the first irregular position of the belt unit is a position where the belt unit rides onto the first engagement portion in a direction different from the second direction.

(Appendix 7)

The image forming apparatus according to any one of appendixes 1 to 6, wherein the apparatus body has a guide member that guides the belt unit in the second direction,
- wherein the belt unit has a guide portion guided by the guide member, and
- wherein the restricting portion is formed integrally with the guide portion.

(Appendix 8)

The image forming apparatus according to any one of appendixes 1 to 7, wherein the restricting portion is a plate-shaped member protruding from the belt unit in the second direction.

(Appendix 9)

The image forming apparatus according to any one of appendixes 1 to 8, wherein the belt unit has a belt, a drive roller that drives the belt, and a bearing portion that rotatably supports a shaft of the drive roller, and wherein the restricting portion is provided in the bearing portion.

DESCRIPTION OF REFERENCE CHARACTERS

1: image forming apparatus, 10, 10K, 10C, 10M, 10Y: process unit (image forming unit), 11: photosensitive drum (image carrier), 12: charging roller (charging member), 13, 13K, 13C, 13M, 13Y: exposure head (exposure device), 14: developing roller (developer carrier), 15: supply roller (supply member), 20: transfer unit (belt unit), 21: transfer roller (transfer member), 22: transfer belt (belt), 23: drive roller, 23*a*: shaft, 24: tension roller, 25: waste toner box, 26: belt frame, 28L, 28R: U-shaped groove, 30: gripping portion, 31L, 31R: bearing portion, 31*a*: protrusion (restricting portion), 31*b*: guide portion, 31*c*: fitting portion (second engagement portion), 31*f*: arm, 31*h*: support hole, 40: fixing unit, 44: unit housing, 45: inlet opening, 45*a*: restriction surface (second contact portion), 46L, 46R: inclined surface (first contact portion), 47L, 47R: retracted surface, 48: wall portion, 50: top cover unit (cover member), 53K, 53C, 53M, 53Y: toner cartridge (developer storage), 56: opening, 60: basket unit, 70: housing, 72: accommodation area of the transfer unit 20, 73: accommodation area of the fixing unit 40, 81L, 81R: guide rail (guide member), 82L, 82R: positioning groove (first engagement portion), 83L, 83R: Post, 85: roller frame, 90: front cover, 100: apparatus body, 110: medium supply section, 120: medium ejection section, 200: toner conveyance path.

What is claimed is:

1. An image forming apparatus, comprising:

an apparatus body having a first engagement portion;

a fixing unit attachable to the apparatus body in a first direction, the fixing unit being configured to fix an image to a medium; and a belt unit attachable to the apparatus body at an attachment position therein in a second direction intersecting the first direction, wherein the belt unit has a restricting portion that restricts attachment of the fixing unit when the belt unit is positioned at a first irregular position different from the attachment position, wherein the belt unit has a second engagement portion capable of engaging the first engagement portion in the second direction, and wherein the first irregular position of the belt unit is a position where the belt unit rides onto the first engagement portion in a direction different from the second direction.

2. The image forming apparatus according to claim 1, further comprising a cover member provided to be openable and closable with respect to the apparatus body, wherein closing of the cover member is restricted by contact of the restricting portion with the fixing unit when the belt unit is positioned at a second irregular position different from the attachment position in a state where the fixing unit is attached to the apparatus body.

3. The image forming apparatus according to claim 2, wherein, when the cover member moves in a closing direction, the belt unit contacts the cover member and is positioned at a position where the closing of the cover member is restricted by contact between the restricting portion and the fixing unit.

4. The image forming apparatus according to claim 1, wherein a unit housing of the fixing unit includes:

a first contact portion that contacts the restricting portion when the attachment of the fixing unit to the apparatus body is restricted by the restricting portion; and a second contact portion disposed in a detachment direction of the fixing unit with respect to the first contact portion, and wherein the restricting portion is elastically deformed by contacting the first contact portion, and further contacts the second contact portion, thereby restricting the attachment of the fixing unit to the apparatus body.

5. The image forming apparatus according to claim 4, wherein the first contact portion has an inclined surface inclined toward the second contact portion.

6. The image forming apparatus according to claim 1, wherein the apparatus body has a guide member that guides the belt unit in the second direction, wherein the belt unit has a guide portion guided by the guide member, and wherein the restricting portion is formed integrally with the guide portion.

7. The image forming apparatus according to claim 1, wherein the restricting portion is a plate-shaped member protruding from the belt unit in the second direction.

8. The image forming apparatus according to claim 1, wherein the belt unit has a belt, a drive roller that drives the belt, and a bearing portion that rotatably supports a shaft of the drive roller, and wherein the restricting portion is provided in the bearing portion.

9. The image forming apparatus according to claim 8, wherein the restricting portion protrudes in a direction perpendicular to an axial direction of the drive roller.

10. The image forming apparatus according to claim 8, wherein, when the belt unit and the fixing unit are attached to the apparatus body, the restricting portion protrudes toward the fixing unit.

11. The image forming apparatus according to claim 8, wherein the restricting portion protrudes in a direction away from the belt.

12. The image forming apparatus according to claim 1, further comprising:

an image forming unit provided in the apparatus body and being configured to form the image to be transferred to the medium.

* * * * *